United States Patent
Zhang et al.

(10) Patent No.: US 10,939,440 B2
(45) Date of Patent: *Mar. 2, 2021

(54) TECHNIQUES FOR CONTENDING FOR ACCESS TO A RADIO FREQUENCY SPECTRUM BAND USING A COORDINATED LISTEN BEFORE TALK PROCEDURE

(71) Applicant: QUALCOMM Incorporated, San Diego, CA (US)

(72) Inventors: Xiaoxia Zhang, San Diego, CA (US); Juan Montojo, San Diego, CA (US); Taesang Yoo, San Diego, CA (US); Siddhartha Mallik, San Diego, CA (US); Aleksandar Damnjanovic, Del Mar, CA (US); Michael Mingxi Fan, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/696,766

(22) Filed: Nov. 26, 2019

(65) Prior Publication Data

US 2020/0100250 A1 Mar. 26, 2020

Related U.S. Application Data

(63) Continuation of application No. 15/486,197, filed on Apr. 12, 2017, now Pat. No. 10,536,944.

(Continued)

(51) Int. Cl.
*H04W 72/04* (2009.01)
*H04W 74/08* (2009.01)
(Continued)

(52) U.S. Cl.
CPC ....... *H04W 72/0453* (2013.01); *H04L 5/0055* (2013.01); *H04W 28/26* (2013.01);
(Continued)

(58) Field of Classification Search
CPC ......... H04W 72/0453; H04W 74/0875; H04W 74/0808; H04W 72/10; H04W 72/0446;
(Continued)

(56) References Cited

U.S. PATENT DOCUMENTS

2014/0328270 A1 11/2014 Zhu et al.
2015/0092758 A1 4/2015 Chen et al.
(Continued)

FOREIGN PATENT DOCUMENTS

WO WO-2016118329 A1 7/2016

OTHER PUBLICATIONS

International Search Report and Written Opinion—PCT/US2017/054543—ISA/EPO—dated Jan. 2, 2018.

*Primary Examiner* — Mazda Sabouri
(74) *Attorney, Agent, or Firm* — Holland & Hart LLP

(57) ABSTRACT

Techniques are described for wireless communication at a wireless device. One method includes identifying a priority of the wireless device for a transmission interval of a radio frequency spectrum band shared by a plurality of network operating entities; identifying an absence of a predetermined transmission type in each of a number of clear channel assessment (CCA) slots of the transmission interval, in which each of the number of CCA slots is associated with a higher priority than the identified priority of the wireless device; and communicating over the radio frequency spectrum band based at least in part on the identified absence of the predetermined transmission type in each of the number of CCA slots associated with the higher priority than the priority of the wireless device.

20 Claims, 16 Drawing Sheets

Related U.S. Application Data

(60) Provisional application No. 62/407,365, filed on Oct. 12, 2016.

(51) Int. Cl.
  *H04L 5/00* (2006.01)
  *H04W 28/26* (2009.01)
  *H04W 72/10* (2009.01)
  *H04W 16/14* (2009.01)
  *H04L 29/06* (2006.01)

(52) U.S. Cl.
  CPC ....... *H04W 72/0446* (2013.01); *H04W 72/10* (2013.01); *H04W 74/0808* (2013.01); *H04W 74/0875* (2013.01); *H04L 69/22* (2013.01); *H04W 16/14* (2013.01)

(58) Field of Classification Search
  CPC .... H04W 28/26; H04W 16/14; H04L 5/0055; H04L 69/22
  See application file for complete search history.

(56) References Cited

U.S. PATENT DOCUMENTS

| | | |
|---|---|---|
| 2015/0223244 A1 | 8/2015 | Tabet et al. |
| 2015/0245411 A1 | 8/2015 | Damnjanovic et al. |
| 2016/0073344 A1 | 3/2016 | Vutukuri et al. |
| 2016/0080954 A1 | 3/2016 | Hedayat et al. |
| 2016/0087826 A1 | 3/2016 | Huang et al. |
| 2016/0212767 A1 | 7/2016 | Yin et al. |
| 2018/0103472 A1 | 4/2018 | Zhang et al. |

TECHNIQUES FOR CONTENDING FOR ACCESS TO A RADIO FREQUENCY SPECTRUM BAND USING A COORDINATED LISTEN BEFORE TALK PROCEDURE

CROSS REFERENCES

The present Application for Patent is a continuation of U.S. patent application Ser. No. 15/486,197 by Zhang, et al., entitled, "Techniques For Contending For Access To A Radio Frequency Spectrum Band Using A coordinated Listen Before Talk Procedure" filed Apr. 12, 2017, which claims priority to U.S. Provisional Patent Application No. 62/407,365 by Zhang, et al., entitled "Techniques For Contending For Access To A Radio Frequency Spectrum Band Using a Coordinated Listen Before Talk Procedure," filed Oct. 12, 2016, assigned to the assignee hereof.

BACKGROUND

The present disclosure, for example, relates to wireless communication systems, and more particularly to techniques for contending for access to a radio frequency spectrum band using a coordinated Listen Before Talk (LBT) procedure.

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

A wireless multiple-access communication system may include a number of network access devices, each simultaneously supporting communication for multiple communication devices, otherwise known as user equipment (UEs). In a Long-Term Evolution (LTE) or LTE-Advanced (LTE-A) network, a network access device may take the form of a base station, with a set of one or more base stations defining an eNodeB (eNB). In a next generation, new radio, or 5G network, a network access device may take the form of a smart radio head (or radio head (RH)) or access node controller (ANC), with a set of smart radio heads in communication with an ANC defining an eNB. A base station or smart radio head may communicate with a set of UEs on downlink channels (e.g., for transmissions from a base station or smart radio head to a UE) and uplink channels (e.g., for transmissions from a UE to a base station or smart radio head).

In some cases, a network access device may communicate with a UE over a radio frequency spectrum band shared by a plurality of network operating entities. In such cases, the network access device and/or UE may need to contend for access to the shared radio frequency spectrum band.

SUMMARY

The described techniques provide for accessing a radio frequency spectrum band using a coordinated LBT procedure. The coordinated LBT procedure may be performed, for a transmission interval, by each of a plurality of wireless devices (e.g., by network access devices or UEs) that desire to communicate over the radio frequency spectrum band during the transmission interval. The wireless devices may include wireless devices associated with, or managed by, different network operating entities. The network operating entities may be associated with different relative priorities for accessing the radio frequency spectrum band during the transmission interval. A wireless device of a network operating entity having a highest priority for accessing the radio frequency spectrum band during the transmission interval may transmit a preamble or reservation message (e.g., a Request-to-Send (RTS) message) over the radio frequency spectrum band in a beginning portion of the transmission interval and communicate over the radio frequency spectrum band with other wireless devices during the transmission interval. A wireless device of a network operating entity having a lower priority for the transmission interval may be configured to refrain from communicating over the radio frequency spectrum band, during the transmission interval, upon detecting a preamble, reservation message, or acknowledgement message transmitted by a wireless device of a network operating entity having a higher priority for the transmission interval. A wireless device of a network operating entity having a lower priority for accessing the radio frequency spectrum band during the transmission interval may communicate over the radio frequency spectrum band after identifying an absence of a predetermined transmission type (e.g., a preamble, reservation message, acknowledgement message, or combination thereof) in each of a number of clear channel assessment (CCA) slots of the transmission interval. Each of the number of CCA slots may be associated with a higher priority than the identified priority of the wireless device. A lower priority wireless device that determines the radio frequency spectrum band is clear for access during a transmission interval may transmit a preamble or reservation message to notify wireless devices of lower priority that the radio frequency spectrum band is reserved for the transmission interval.

In one example, a method for wireless communication at a wireless device is described. The method may include identifying a priority of the wireless device for a transmission interval of a radio frequency spectrum band shared by a plurality of network operating entities; identifying an absence of a predetermined transmission type in each of a number of CCA slots of the transmission interval, in which each of the number of CCA slots is associated with a higher priority than the identified priority of the wireless device; and communicating over the radio frequency spectrum band based at least in part on the identified absence of the predetermined transmission type in each of the number of CCA slots associated with the higher priority than the priority of the wireless device.

In some examples of the method, the communicating may include transmitting a preamble over the radio frequency spectrum band. The preamble may be transmitted in a CCA slot of the transmission interval. The CCA slot may be associated with the priority of the wireless device. The communicating may also include transmitting or receiving data over the radio frequency spectrum band during the transmission interval. In some examples, the method may further include signaling a length of the transmission interval in the preamble.

In some examples of the method, the communicating may include transmitting a reservation message over the radio frequency spectrum band. The reservation message may be transmitted in a CCA slot of the transmission interval. The CCA slot may be associated with the priority of the wireless device. The communicating may also include detecting, in the CCA slot, an acknowledgement message transmitted over the radio frequency spectrum band in response to the reservation message; and transmitting or receiving data over the radio frequency spectrum band, during the transmission interval, based at least in part on the detecting of the acknowledgement message. In some examples, the reservation message may include a RTS message and the acknowledgement message may include a CTS message.

In some examples of the method, the predetermined transmission type may include at least one of a preamble, a reservation message, a RTS message, an acknowledgement message, a CTS message, or a combination thereof. In some examples, the transmission interval may be a first transmission interval, and the method may further include identifying a second priority of the wireless device for a second transmission interval of the radio frequency spectrum band. The second priority may be different from the priority of the wireless device for the first transmission interval. In some examples, the method may include monitoring the radio frequency spectrum band during each of the number of CCA slots.

In one example, an apparatus for wireless communication at a wireless device is described. The apparatus may include a processor, memory in electronic communication with the processor, and instructions stored in the memory. The instructions may be operable, when executed by the processor, to cause the apparatus to identify a priority of the wireless device for a transmission interval of a radio frequency spectrum band shared by a plurality of network operating entities; to identify an absence of a predetermined transmission type in each of a number of CCA slots of the transmission interval, in which each of the number of CCA slots is associated with a higher priority than the identified priority of the wireless device; and to communicate over the radio frequency spectrum band based at least in part on the identified absence of the predetermined transmission type in each of the number of CCA slots associated with the higher priority than the priority of the wireless device.

In some examples of the apparatus, the instructions to cause the apparatus to communicate may include instructions to cause the apparatus to transmit a preamble over the radio frequency spectrum band. The preamble may be transmitted in a CCA slot of the transmission interval. The CCA slot may be associated with the priority of the wireless device. The instructions to cause the apparatus to communicate may also include instructions to cause the apparatus to transmit or receive data over the radio frequency spectrum band during the transmission interval. In some examples, the instructions, when executed by the processor, may cause the apparatus to signal a length of the transmission interval in the preamble.

In some examples of the apparatus, the instructions to cause the apparatus to communicate may include instructions to cause the apparatus to transmit a reservation message over the radio frequency spectrum band. The reservation message may be transmitted in a CCA slot of the transmission interval. The CCA slot may be associated with the priority of the wireless device. The instructions to cause the apparatus to communicate may also include instructions to cause the apparatus to detect, in the CCA slot, an acknowledgement message transmitted over the radio frequency spectrum band in response to the reservation message; and to transmit or receive data over the radio frequency spectrum band, during the transmission interval, based at least in part on the detecting of the acknowledgement message. In some examples, the reservation message may include a RTS message and the acknowledgement message may include a CTS message.

In some examples of the apparatus, the predetermined transmission type may include at least one of a preamble, a reservation message, a RTS message, an acknowledgement message, a CTS message, or a combination thereof. In some examples, the transmission interval may be a first transmission interval, and the instructions, when executed by the processor, may further cause the apparatus to identify a second priority of the wireless device for a second transmission interval of the radio frequency spectrum band. The second priority may be different from the priority of the wireless device for the first transmission interval. In some examples, the instructions, when executed by the processor, may cause the apparatus to monitor the radio frequency spectrum band during each of the number of CCA slots.

In one example, another apparatus for wireless communication at a wireless device is described. The apparatus may include means for identifying a priority of the wireless device for a transmission interval of a radio frequency spectrum band shared by a plurality of network operating entities; means for identifying an absence of a predetermined transmission type in each of a number of CCA slots of the transmission interval, in which each of the number of CCA slots associated with a higher priority than the identified priority of the wireless device; and means for communicating over the radio frequency spectrum band based at least in part on the identified absence of the predetermined transmission type in each of the number of CCA slots associated with the higher priority than the priority of the wireless device.

In some examples of the apparatus, the means for communicating may include means for transmitting a preamble over the radio frequency spectrum band. The preamble may be transmitted in a CCA slot of the transmission interval. The CCA slot may be associated with the priority of the wireless device. The means for communicating may also include means for transmitting or receiving data over the radio frequency spectrum band during the transmission interval.

In some examples of the apparatus, the means for communicating may include means for transmitting a reservation message over the radio frequency spectrum band. The reservation message may be transmitted in a CCA slot of the transmission interval. The CCA slot may be associated with the priority of the wireless device. The means for communicating may also include means for detecting, in the CCA slot, an acknowledgement message transmitted over the radio frequency spectrum band in response to the reservation message; and means for transmitting or receiving data over the radio frequency spectrum band, during the transmission interval, based at least in part on the detecting of the acknowledgement message. In some examples, the reservation message may include a RTS message and the acknowledgement message may include a CTS message.

DETAILED DESCRIPTION

Figure 1:
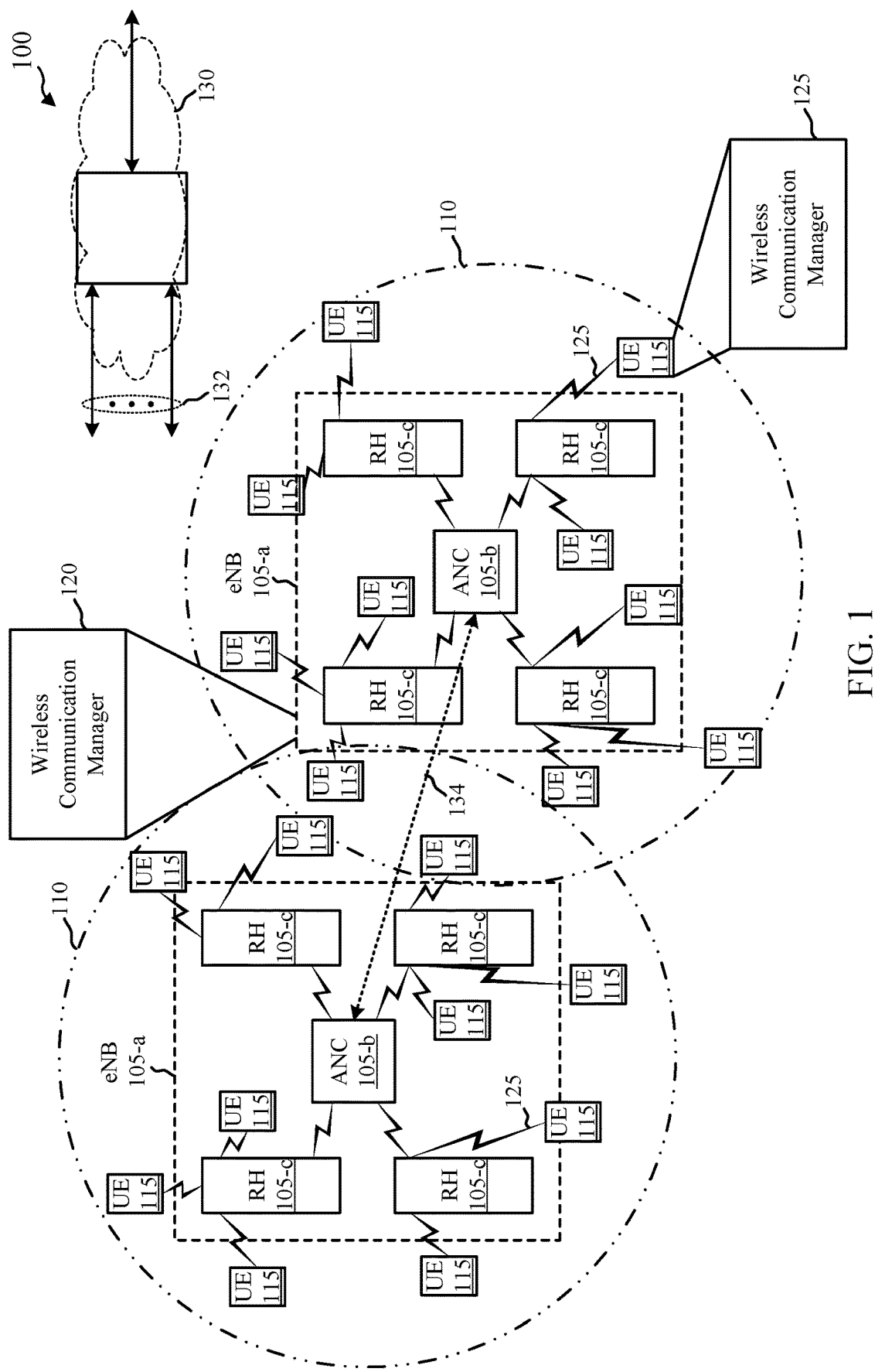
FIG. 1 shows an example of a wireless communication system, in accordance with one or more aspects of the disclosure.

Wireless communication systems operated by different network operating entities (e.g., network operators) may share a radio frequency spectrum band (shared spectrum). In some preferred instances, a network operating entity may be configured to use an entirety of a designated shared spectrum for at least a period of time before another network operating entity uses the entirety of the designated shared spectrum for a different period of time. Thus, in order to allow network operating entities use of the full designated shared spectrum, and in order to mitigate interfering communications between the different network operating entities, certain resources (e.g., time) may be partitioned and allocated to the different network operating entities for certain types of communication.

For example, a network operating entity may be allocated certain time resources reserved for exclusive communication by the network operating entity using the entirety of the shared spectrum. The network operating entity may also be allocated other time resources where the entity is given priority over other network operating entities to communicate. These time resources, prioritized for use by the network operating entity, may be utilized by other network operating entities on an opportunistic basis if the prioritized network operating entity does not utilize the resources. Additional time resources may be allocated for any network operator to use on an opportunistic basis.

Access to the shared spectrum and the arbitration of time resources among different network operating entities may be centrally controlled by a separate entity, autonomously determined by a predefined arbitration scheme, or dynamically determined based on interactions between wireless nodes of the network operators.

In some cases, wireless devices may contend for access to a shared spectrum for a transmission interval. In these cases, the wireless devices of different network operating entities may be associated with different priorities for accessing (or communicating over) the shared spectrum during the transmission interval. For example, the wireless devices of a first network operating entity may have a highest priority for communicating over the shared spectrum, the wireless devices of a second network operating entity may have a second highest priority for communicating over the shared spectrum, and the wireless devices of a third network operating entity may have a third highest priority for communicating over the shared spectrum. Based at least in part on the priorities associated with the wireless devices of the different network operating entities, the wireless devices may perform a coordinated LBT procedure (i.e., a LBT procedure in which the wireless devices of different network operating entities are allocated opportunities to access the shared spectrum at different times, but are only allowed to access the shared spectrum if the wireless devices of a higher priority network operating entity have not already reserved the shared spectrum for the transmission interval).

Aspects of the disclosure are initially described in the context of wireless communication systems. Aspects of the disclosure are also described in the context of timing diagrams. Aspects of the disclosure are further illustrated by and described with reference to apparatus diagrams, system diagrams, and flowcharts that relate to accessing a radio frequency spectrum band in accordance with a coordinated LBT procedure.

FIG. 1 shows an example of a wireless communication system 100, in accordance with one or more aspects of the disclosure. The wireless communication system 100 may include network access devices 105 (e.g., eNBs 105-a, ANCs 105-b, and/or RHs 105-c), UEs 115, and a core network (CN) 130. The core network 130 may provide user authentication, access authorization, tracking, Internet Protocol (IP) connectivity, and other access, routing, or mobility functions. At least some of the network access devices 105 (e.g., eNBs 105-a or ANCs 105-b) may interface with the core network 130 through backhaul links 132 (e.g., S1, S2, etc.) and may perform radio configuration and scheduling for communication with the UEs 115. In various examples, the ANCs 105-b may communicate, either directly or indirectly (e.g., through core network 130), with each other over backhaul links 134 (e.g., X1, X2, etc.), which may be wired or wireless communication links. Each ANC 105-b may also communicate with a number of UEs 115 through a number of smart radio heads (e.g., RHs 105-c). In an alternative configuration of the wireless communication system 100, the functionality of an ANC 105-b may be provided by a radio head 105-c or distributed across the radio heads 105-c of an eNB 105-a. In another alternative configuration of the wireless communication system 100 (e.g., an LTE/LTE-A configuration), the radio heads 105-c may be replaced with base stations, and the ANCs 105-b may be replaced by base station controllers (or links to the core network 130). In some examples, the wireless communication system 100 may include a mix of radio heads 105-c, base stations, and/or other network access devices 105 for receiving/transmitting communications according to different radio access technologies (RATs) (e.g., LTE/LTE-A, 5G, Wi-Fi, etc.).

A macro cell may cover a relatively large geographic area (e.g., several kilometers in radius) and may allow unrestricted access by UEs 115 with service subscriptions with a network provider. A small cell may include a lower-powered radio head or base station, as compared with a macro cell, and may operate in the same or different frequency band(s) as macro cells. Small cells may include pico cells, femto cells, and micro cells according to various examples. A pico cell may cover a relatively smaller geographic area and may allow unrestricted access by UEs 115 with service subscriptions with a network provider. A femto cell also may cover a relatively small geographic area (e.g., a home) and may provide restricted access by UEs 115 having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB or a home eNB. An eNB may support one or multiple (e.g., two, three, four, and the like) cells (e.g., component carriers).

The wireless communication system 100 may support synchronous or asynchronous operation. For synchronous operation, the eNBs 105-a and/or radio heads 105-c may have similar frame timing, and transmissions from different eNBs 105-a and/or radio heads 105-c may be approximately aligned in time. For asynchronous operation, the eNBs 105-a and/or radio heads 105-c may have different frame timings, and transmissions from different eNBs 105-a and/or radio heads 105-c may not be aligned in time. The techniques described herein may be used for either synchronous or asynchronous operations.

The communication networks that may accommodate some of the various disclosed examples may be packet-based networks that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use Hybrid ARQ (HARD) to provide retransmission at the MAC layer to improve link efficiency. In the control plane, the Radio Resource Control (RRC) protocol layer may provide establishment, configuration, and maintenance of an RRC connection between a UE 115 and a radio head 105-c, ANC 105-b, or core network 130 supporting radio bearers for user plane data. At the Physical (PHY) layer, transport channels may be mapped to physical channels.

The UEs 115 may be dispersed throughout the wireless communication system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, an Internet of Everything (IoE) device, etc. A UE 115 may be able to communicate with various types of eNBs 105-a, radio heads 105-c, base stations, access points, or other network access devices, including macro eNBs, small cell eNBs, relay base stations, and the like. A UE 115 may also be able to communicate directly with other UEs 115 (e.g., using a peer-to-peer (P2P) protocol).

The communication links 125 shown in wireless communication system 100 may include uplinks (ULs) from a UE 115 to a radio head 105-c, and/or downlinks (DLs), from a radio head 105-c to a UE 115. The downlinks may also be called forward links, while the uplinks may also be called reverse links. Control information and data may be multiplexed on an uplink or downlink according to various techniques. Control information and data may be multiplexed on an uplink or downlink, for example, using TDM techniques, FDM techniques, or hybrid TDM-FDM techniques.

Each communication link 125 may include one or more carriers, where each carrier may be a signal made up of multiple sub-carriers (e.g., waveform signals of different frequencies) modulated according to one or more radio access technologies. Each modulated signal may be sent on a different sub-carrier and may carry control information (e.g., reference signals, control channels, etc.), overhead information, user data, etc. The communication links 125 may transmit bidirectional communications using Frequency Division Duplexing (FDD) techniques (e.g., using paired spectrum resources) or Time Division Duplexing techniques (e.g., using unpaired spectrum resources). Frame structures for FDD (e.g., frame structure type 1) and TDD (e.g., frame structure type 2) may be defined.

In some examples of the wireless communication system 100, network access devices 105 (e.g., radio heads 105-c) and UEs 115 may include multiple antennas for employing antenna diversity schemes to improve communication quality and reliability between network access devices 105 and UEs 115. Additionally or alternatively, network access devices and UEs 115 may employ multiple-input, multiple-output (MIMO) techniques that may take advantage of multi-path environments to transmit multiple spatial layers carrying the same or different coded data. In some cases, signal processing techniques such as beamforming (i.e., directional transmission) may be used with MIMO techniques to coherently combine signal energies and overcome the path loss in specific beam directions. Precoding (e.g., weighting transmissions on different paths or layers, or from different antennas) may be used in conjunction with MIMO or beamforming techniques.

The wireless communication system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both FDD and TDD component carriers. A carrier may be established over dedicated spectrum (e.g., a dedicated radio frequency spectrum band) or shared spectrum (e.g., a shared radio frequency spectrum band).

In some examples, a UE 115 may include a wireless communication manager 120. The wireless communication manager 120 may be used to identify a priority of the UE 115 for a transmission interval of a radio frequency spectrum band shared by a plurality of network operating entities (a transmission interval of shared spectrum); identify an absence of a predetermined transmission type in each of a number of CCA slots of the transmission interval, in which each of the number of CCA slots is associated with a higher priority than the identified priority of the UE 115; and communicate over the radio frequency spectrum band based at least in part on the identified absence of the predetermined transmission type in each of the number of CCA slots associated with the higher priority than the priority of the UE 115. In some examples, the wireless communication manager 120 may include aspects of the wireless communication manager 820, 920, or 1000 described with reference to FIG. 8, 9, or 10.

In some examples, one or a combination of network access devices 105 may include a wireless communication manager 140. The wireless communication manager 140 may be used to identify a priority of the network access device 105 for a transmission interval of a radio frequency spectrum band shared by a plurality of network operating entities; identify an absence of a predetermined transmission type in each of a number of CCA slots of the transmission interval, in which each of the number of CCA slots is associated with a higher priority than the identified priority of the network access device 105; and communicate over the radio frequency spectrum band based at least in part on the identified absence of the predetermined transmission type in each of the number of CCA slots associated with the higher priority than the priority of the network access device 105. In some examples, the wireless communication manager 140 may include aspects of the wireless communication manager 820, 920, or 1000 described with reference to FIG. 8, 9, or 10.

Figure 2:
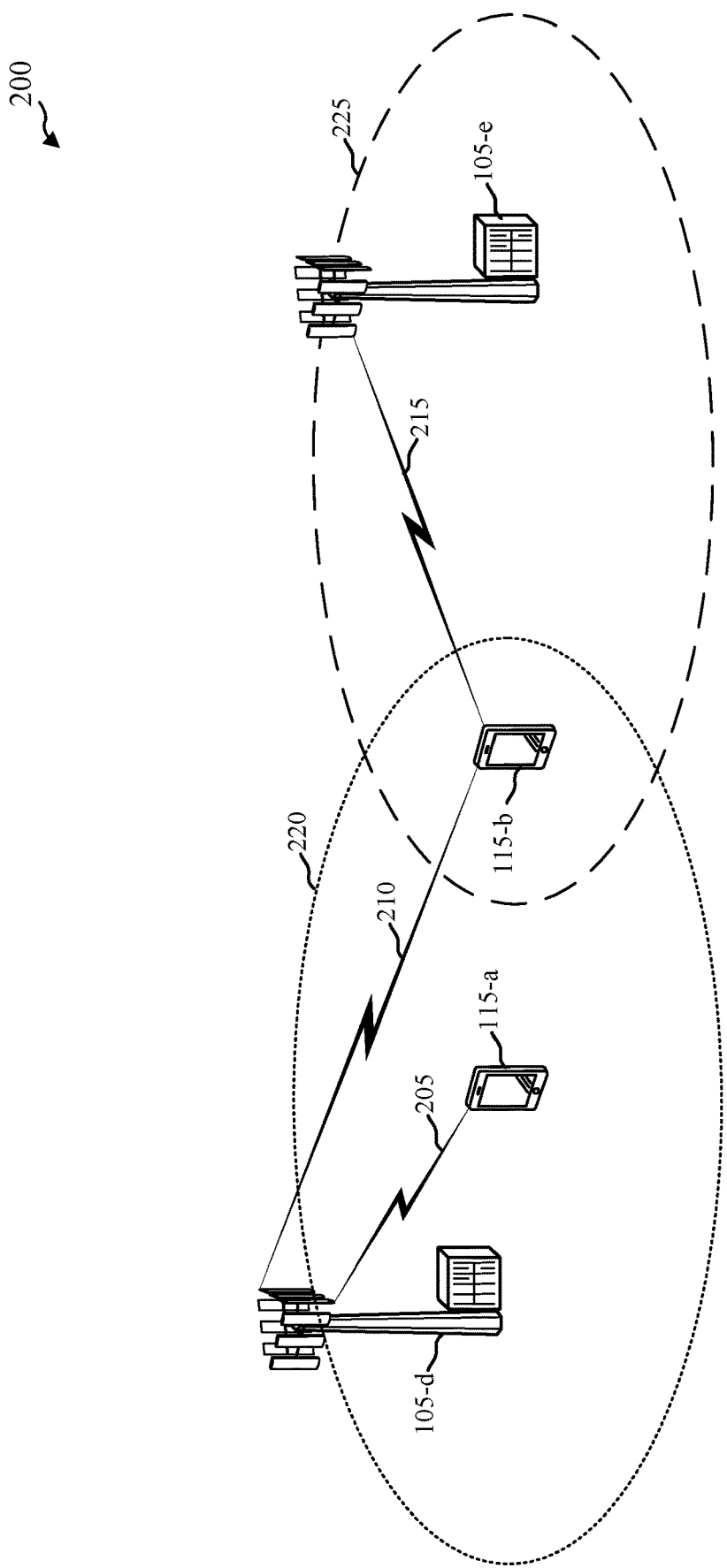
FIG. 2 shows an example of a wireless communication system that supports coordinated resource partitioning, in accordance with various aspects of the present disclosure.

FIG. 2 shows an example of a wireless communication system 200 that supports coordinated resource partitioning, in accordance with various aspects of the present disclosure. Wireless communication system 200 may include a first network access device 105-d, a second network access device 105-e, a first UE 115-a, and a second UE 115-b, which may be examples of the corresponding devices described with reference to FIG. 1. The first network access device 105-d and second network access device 105-e may communicate with UEs 115 or other wireless devices within their respective coverage areas 220 and 225. In some examples, the wireless communication system 200 may be operated by multiple network operating entities (e.g., network operators), and the different network operating entities may share wireless spectrum (e.g., shared spectrum including a radio frequency spectrum band). In accordance with aspects of the present disclosure, the resources (e.g., time) shared between the network operating entities may be partitioned and allocated among the network operating entities to facilitate coordinated communications.

The first network access device 105-d may be operated by one or more network operating entities. For example, the first network access device 105-d may be operated by a first network operating entity and may communicate with the first UE 115-a via a first communication link 205, and the first network access device 105-d may be operated by a second network operating entity and may communicate with the second UE 115-b via a second communication link 210.

As described in more detail below, the coordination at the first network access device 105-d of communications between UE 115-a and UE 115-b may be based on a partitioned and allocated time scale between the first and second network operators.

The second network access device 105-e may also be operated by one or more network operating entities. In some examples, the second network access device 105-e may be operated by a third network operating entity to communicate with the second UE 115-b via a third communication link 215. In this example, the second UE 115-b may be configured to operate with both the second and third network operating entities. The coordination at the second UE 115-b, of communications between first network access device 105-d and the second network access device 105-e, may be based on a partitioned and allocated time scale between the second and third network operators.

The shared spectrum used by the wireless communication system 200 may be efficiently used by employing a coordinated resource partitioning scheme between the multiple network operating entities. For example, the shared spectrum may be partitioned by classifying time resources into intervals (e.g., transmission intervals) and assigning the intervals to different network operating entities. In some examples, certain time intervals may be allocated for exclusive use by a particular network operating entity. Other time intervals may be allocated for prioritized use by a particular network operating entity, but may also be for opportunistic use by the other network operating entities. In yet other examples, certain time intervals may be designated for opportunistic use by all network operating entities.

Access to the wireless communication system 200, the portioning and allocation of the resources, and/or the synchronization of the network operating entities may be controlled by a central coordinator (e.g., a spectrum access system (SAS)). In some examples, the partition and classification of resources may be autonomously determined based on the number of network operating entities. Synchronization between the network operating entities may occur explicitly through centralized signaling. Additionally or alternatively, the entities may employ a self-synchronization scheme based on "network-listening" where the wireless nodes (e.g., the network access devices 105) from different network operating entities listen to each other and determine a timing synchronization accordingly.

Figure 3:
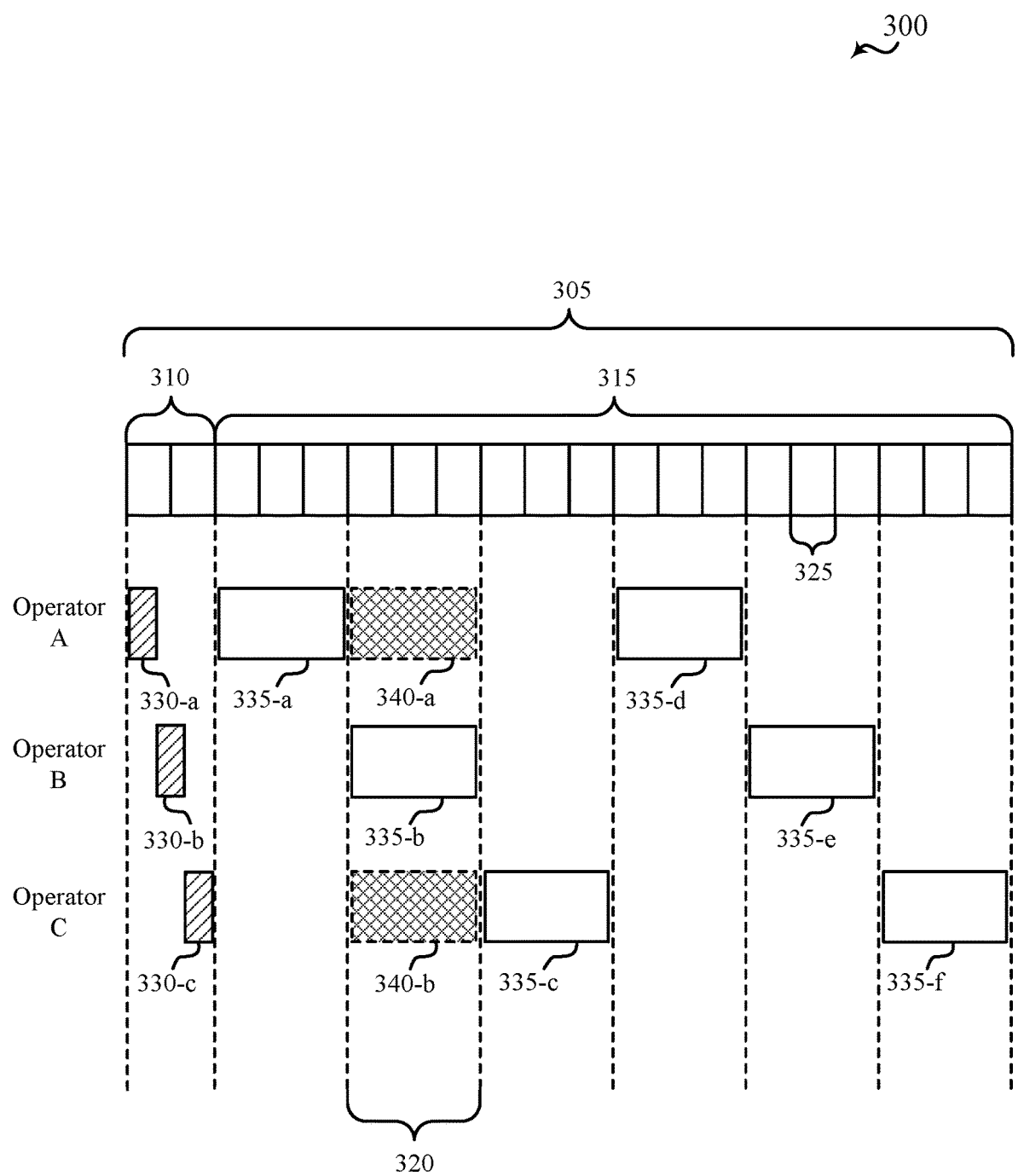
FIG. 3 shows an example of a timing diagram 300 for coordinated resource partitioning, in accordance with various aspects of the present disclosure.

FIG. 3 shows an example of a timing diagram 300 for coordinated resource partitioning, in accordance with various aspects of the present disclosure. The timing diagram 300 includes a superframe 305, which may represent a fixed duration of time (e.g., 20 milliseconds (ms)). Superframe 305 may be repeated for a given communication session and may be used by a wireless system such as wireless communication system 100 or 200 described with reference to FIG. 1 or 2. The superframe 305 may be divided into intervals such as an acquisition interval (A-INT) 310 and an arbitration interval 315. As described in more detail below, the A-INT 310 and arbitration interval 315 may be subdivided into sub-intervals, designated for certain resource types, and allocated to different network operating entities to facilitate coordinated communications between the different network operating entities. For example, the arbitration interval 315 may be divided into a plurality of sub-intervals 320. Also, the superframe 305 may be further divided into a plurality of subframes 325 with a fixed duration (e.g., 1 ms). While timing diagram 300 illustrates three different network operating entities (e.g., Operator A, Operator B, Operator C), the number of network operating entities using the superframe 305 for coordinated communications may be greater than or fewer than the number illustrated in timing diagram 300.

The A-INT 310 may be a dedicated interval of the superframe 305 that is reserved for exclusive communications by the network operating entities. In some examples, each network operating entity may be allocated certain resources within the A-INT 310 for exclusive communications. For example, resources 330-*a* may be reserved for exclusive communications by Operator A, resources 330-*b* may be reserved for exclusive communications by Operator B, and resources 330-*c* may be reserved for exclusive communications by Operator C. Since the resources 330-*a* are reserved for exclusive communications by Operator A, neither Operator B nor Operator C can communicate during resources 330-*a*, even if Operator A chooses not to communicate during those resources. That is, access to exclusive resources is limited to the designated network operator. Similar restrictions apply to resources 330-*b* for Operator B and resources 330-*c* for Operator C. The wireless nodes of Operator A (e.g., UEs 115 or network access devices 105) may communicate any information desired during their exclusive resources 330-*a*, such as control information or data.

When communicating over an exclusive resource, a network operating entity does not need to perform any medium sensing procedures (e.g., Listen Before Talk (LBT) or clear channel assessment (CCA)) because the network operating entity knows that the resources are reserved. Because only the designated network operating entity may communicate over exclusive resources, there may be a reduced likelihood of interfering communications as compared to relying on medium sensing techniques alone (e.g., no hidden node problem). In some examples, the A-INT 310 is used to transmit control information, such as synchronization signals (e.g., SYNC signals), system information (e.g., system information blocks (SIBs)), paging information (e.g., physical broadcast channel (PBCH) messages), or random access information (e.g., random access channel (RACH) signals). In some examples, all of the wireless nodes associated with a network operating entity may transmit at the same time during their exclusive resources.

In some examples, resources may be classified as prioritized for certain network operating entities. Resources that are assigned with priority for a certain network operating entity may be referred to as a guaranteed interval (G-INT) for that network operating entity. The interval of resources used by the network operating entity during the G-INT may be referred to as a prioritized sub-interval. For example, resources 335-*a* may be prioritized for use by Operator A and may therefore be referred to as a G-INT for Operator A (e.g., G-INT-OpA). Similarly, resources 335-*b* may be prioritized for Operator B, resources 335-*c* may be prioritized for Operator C, resources 335-*d* may be prioritized for Operator A, resources 335-*e* may be prioritized for Operator B, and resources 335-*f* may be prioritized for operator C.

The various G-INT resources illustrated in FIG. 3 appear to be staggered to illustrate their association with their respective network operating entities, but these resources may all be on the same frequency bandwidth. Thus, if viewed along a time-frequency grid, the G-INT resources may appear as a contiguous line within the superframe 305. This partitioning of data may be an example of time division multiplexing (TDM). Also, when resources appear in the same sub-interval (e.g., resources 340-*a* and resources 335-*b*), these resources represent the same time resources with respect to the superframe 305 (e.g., the resources occupy the same sub-interval 320), but the resources are separately designated to illustrate that the same time resources can be classified differently for different operators.

When resources are assigned with priority for a certain network operating entity (e.g., a G-INT), that network operating entity may communicate using those resources without having to wait or perform any medium sensing procedures (e.g., LBT or CCA). For example, the wireless nodes of Operator A are free to communicate any data or control information during resources 335-*a* without interference from the wireless nodes of Operator B or Operator C.

A network operating entity may additionally signal to another operator that it intends to use a particular G-INT. For example, referring to resources 335-*a*, Operator A may signal to Operator B and Operator C that it intends to use resources 335-*a*. Such signaling may be referred to as an activity indication. Moreover, since Operator A has priority over resources 335-*a*, Operator A may be considered as a higher priority operator than both Operator B and Operator C. However, as discussed above, Operator A does not have to perform a medium sensing procedure (e.g., LBT or CCA) to ensure interference-free transmission during resources 335-*a* because the resources 335-*a* are assigned with priority to Operator A.

Similarly, a network operating entity may signal to another network operating entity that it intends not to use a particular G-INT. This signaling may also be referred to as an activity indication. For example, referring to resources 335-*b*, Operator B may signal to Operator A and Operator C that it intends not to use the resources 335-*b* for communication, even though the resources are assigned with higher priority to Operator B compared to Operator A and Operator C. With reference to resources 335-*b*, Operator B may be considered a higher priority network operating entity than Operator A and Operator C. In such cases, Operators A and C may attempt to use resources of sub-interval 320 on an opportunistic basis. Thus, from the perspective of Operator A, the sub-interval 320 that contains resources 335-*b* may be considered an opportunistic interval (O-INT) for Operator A (e.g., O-INT-OpA). For illustrative purposes, resources 340-*a* may represent the O-INT for Operator A. Also, from the perspective of Operator C, the same sub-interval 320 may represent an O-INT for Operator C with corresponding resources 340-*b*. Resources 340-*a*, 335-*b*, and 340-*b* all represent the same time resources (e.g., a particular sub-interval 320), but are identified separately to signify that the same resources may be considered as a G-INT for some network operating entities and yet as an O-INT for others.

To utilize resources on an opportunistic basis, Operator A and Operator C may perform medium-sensing procedures to check for communications on a particular channel before transmitting data. For example, if Operator B decides not to use resources 335-*b* (e.g., G-INT-OpB), then Operator A may use those same resources (e.g., represented by resources 340-*a*) by first checking the channel for interference (e.g., LBT) and then transmitting data if the channel was determined to be clear. Similarly, if Operator C wanted to access resources on an opportunistic basis during sub-interval 320 (e.g., use an O-INT represented by resources 340-*b*) in response to an indication that Operator B was not going to use its G-INT, Operator C may perform a medium sensing procedure and access the resources if available. In some cases, two operators (e.g., Operator A and Operator C) may attempt to access the same resources, in which case the operators may employ contention-based procedures to avoid interfering communications. The operators may also have sub-priorities assigned to them designed to determine which operator may gain access to resources if more than operator is attempting access simultaneously. For example, during a particular G-INT-OpB, Operator A may have a higher priority than Operator C. When Operator A and Operator C both detect that G-INT-OpB is available, Operator A, having the higher priority, may be allowed to use G-INT-OpB. On the other hand, Operator C can only use G-INT-OpB when it does not detect activity from both Operator A and Operator B. The sub-priorities between Operator A and Operator C during the G-INT-OpB can effectively avoid the potential collision between Operator A and Operator C.

In some examples, a network operating entity may intend not to use a particular G-INT assigned to it, but may not send out an activity indication that conveys the intent not to use the resources. In such cases, for a particular sub-interval 320, lower priority operating entities may be configured to monitor the channel to determine whether a higher priority operating entity is using the resources. If a lower priority operating entity determines through LBT or similar method that a higher priority operating entity is not going to use its G-INT/O-INT resources, then the lower priority operating entities may attempt to access the resources on an opportunistic basis as described above.

In some examples, access to a G-INT or O-INT may be preceded by a reservation signal (e.g., request-to-send (RTS)/clear-to-send (CTS)), and the contention window (CW) may be randomly chosen between one and the total number of operating entities. In another example, the CW or the random number for each operator to sense the medium and transmit a reservation signal may be prearranged. The prearrangement can be done via an SAS server or through coordination among operators.

In some examples, an operating entity may employ or be compatible with coordinated multipoint (CoMP) communications. For example, an operating entity may employ CoMP and dynamic time division duplex (TDD) in a G-INT and opportunistic CoMP and opportunistic dynamic TDD in an O-INT as needed.

In the example illustrated in FIG. 3, each sub-interval 320 includes a G-INT for one of Operator A, B, or C. However, in some cases, one or more sub-intervals 320 may include resources that are neither reserved for exclusive use nor reserved for prioritized use (e.g., unassigned resources). Such unassigned resources may be considered an O-INT for any network operating entity, and may be accessed on an opportunistic basis as described above.

In some examples, each subframe 325 may contain 14 symbols (e.g., 250-µs for 60 kHz tone spacing or 500-us for 30 KHz tone spacing, etc). These subframes 325 may be standalone, self-contained Interval-Cs (ITCs) or the subframes 325 may be a part of a long ITC. An ITC may be a self-contained transmission starting with a downlink transmission and ending with a uplink transmission. In some embodiments, an ITC may contain one or more subframes 325 operating contiguously upon medium occupation. In some cases, there may be a maximum of eight network operators in an A-INT 310 (e.g., with duration of 2 ms) assuming a 250-µs transmission opportunity.

Although three operators are illustrated in FIG. 3, it should be understood that more or less network operating entities may be configured to operate in a coordinated manner as described above. In some cases, the location of the G-INT, O-INT, or A-INT within superframe 305 for each operator is determined autonomously based on the number of network operating entities active in a system. For example, if there is only one network operating entity, each sub-interval 320 may be occupied by a G-INT for that single network operating entity, or the sub-intervals 320 may alternate between G-INTs for that network operating entity and O-INTs to allow other network operating entities to enter. If there are two network operating entities, the sub-intervals 320 may alternate between G-INTs for the first network operating entity and G-INTs for the second network operating entity. If there are three network operating entities, the G-INT and O-INTs for each network operating entity may be designed as illustrated in FIG. 3. If there are four network operating entities, the first four sub-intervals 320 may include consecutive G-INTs for the four network operating entities and the remaining two sub-intervals 320 may contain O-INTs. Similarly, if there are five network operating entities, the first five sub-intervals 320 may contain consecutive G-INTs for the five network operating entities and the remaining sub-interval 320 may contain an O-INT. If there are six network operating entities, all six sub-intervals 320 may include consecutive G-INTs for each network operating entity. It should be understood that these examples are for illustrative purposes only and that other autonomously determined interval allocations may be used.

It should be understood that the coordination framework described with reference to FIG. 3 is for illustration purposes only. For example, the duration of superframe 305 may be more or less than 20 ms. Also, the number, duration, and location of sub-intervals 320 and subframes 325 may differ from the configuration illustrated. Also, the types of resource designations (e.g., exclusive, prioritized, unassigned) may differ or include more or less sub-designations.

In some examples, contention for access to a transmission interval (e.g., medium sensing for one of the G-INT or O-INT sub-intervals described with reference to FIG. 3) may be resolved using a protected preamble-based LBT procedure. A protected preamble-based LBT procedure may provide a CCA slot for each of a plurality of network operating entities. The CCA slots are protected in that a wireless device may only transmit a preamble in a CCA slot if the wireless device is associated with a network operating entity to which the CCA slot is allocated. The CCA slots are also prioritized, such that the wireless devices of a network operating entity given a highest priority for accessing a transmission interval are given an opportunity to transmit a preamble in a highest priority CCA slot, and if a wireless device of the network operating entity given the highest priority for accessing the transmission interval transmits a preamble in the highest priority CCA slot, wireless devices of other network operating entities (that detect the preamble transmission) are not allowed to transmit a preamble in a lower priority CCA slot), and so on for each next highest priority level.

Figure 4:
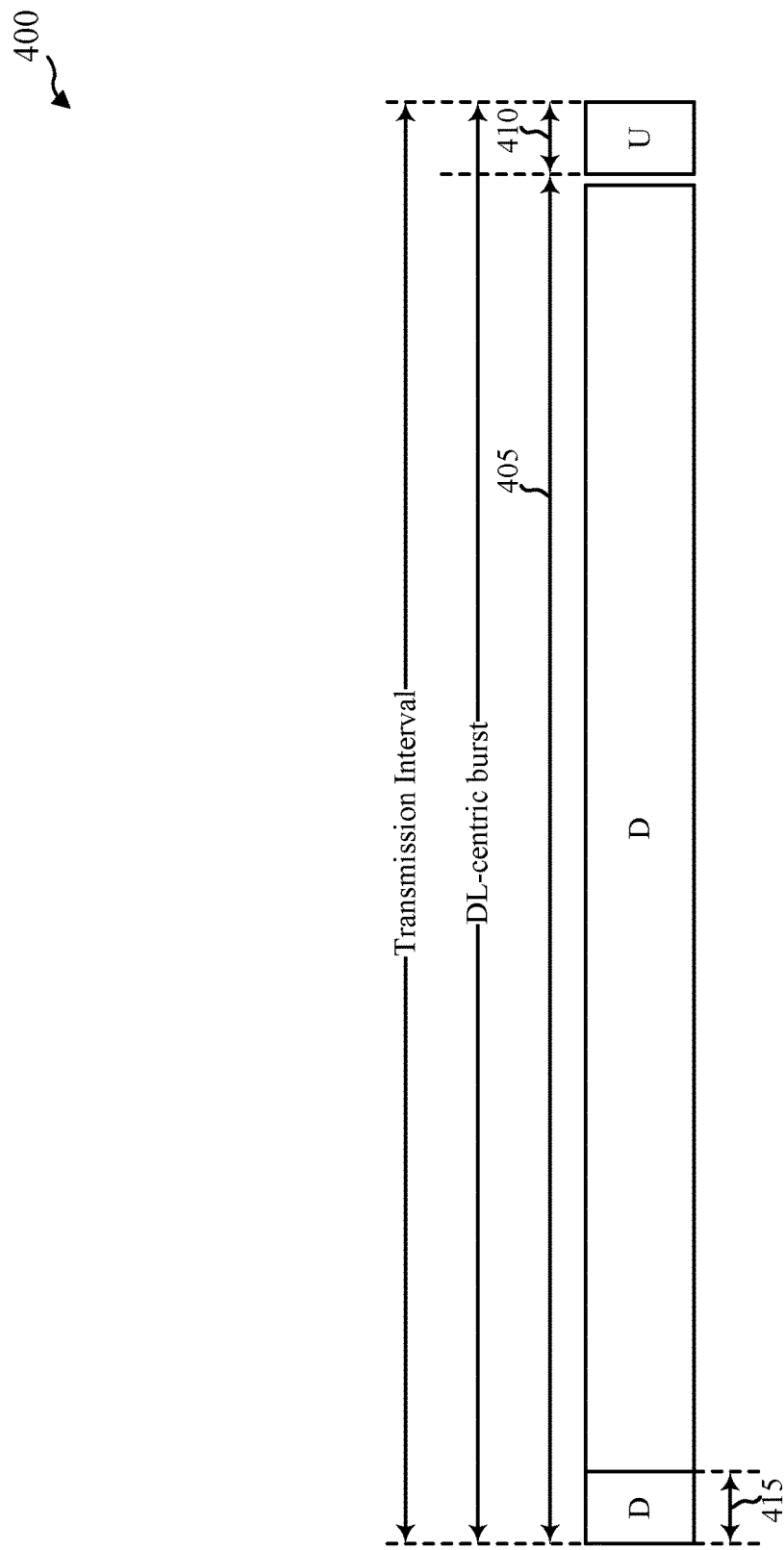
FIG. 4 shows a transmission scenario during a transmission interval of a radio frequency spectrum band, in accordance with various aspects of the present disclosure.

FIG. 4 shows a transmission scenario during a transmission interval 400 of a radio frequency spectrum band, in accordance with various aspects of the present disclosure. The radio frequency spectrum band may be shared by a plurality of network operating entities. In some examples, the transmission interval 400 may be one of the G-INT or O-INT sub-intervals described with reference to FIG. 3. By way of example, the transmission interval 400 is shown to include a downlink (DL)-centric burst, in which a downlink transmission 405 is followed by a much shorter uplink transmission 410. Alternatively, the transmission interval 400 could include a purely downlink burst, an uplink (UL)-centric burst, or some other combination of downlink and uplink transmissions.

For the transmission interval 400, the wireless devices (e.g., the network access devices or UEs) of a first network operating entity may have a highest priority for communicating over the radio frequency spectrum band, the wireless devices of a second network operating entity may have a second highest priority for communicating over the radio frequency spectrum band, and the wireless devices of a third network operating entity may have a third highest priority for communicating over the radio frequency spectrum band. In other transmission intervals, the relative priorities of the wireless devices of the network operating entities may be the same or different, as described, for example, with reference to FIG. 3. In some examples, the relative priorities of the wireless devices of different network operating entities may depend on a proximity of a transmission interval (e.g., the transmission interval 400) to a G-INT sub-interval of a network operating entity (e.g., in a first opportunistic transmission interval following a G-INT for the wireless devices of the third network operating entity, the wireless devices of the third network operating entity may have a lowest priority for accessing (or communicating over) the transmission interval). In general, the priority of the network operating entities on each transmission interval may be prearranged. The prearrangement can be done via an SAS server or through coordination among network operating entities.

As shown in FIG. 4, one or more wireless devices of the first network operating entity may communicate over the radio frequency spectrum band without performing a LBT procedure for the transmission interval 400, because wireless devices of the first network operating entity have priority over the wireless devices of other network operating entities for communicating over the radio frequency spectrum band during the transmission interval 400. During or prior to a predetermined portion 415 (e.g., a beginning portion) of the transmission interval 400, the wireless device(s) of the first network operating entity may transmit a preamble over the radio frequency spectrum band. The preamble may have a predefined format or structure. In some examples, the preamble may signal a duration (e.g., a full duration, a remaining duration, a downlink duration, or an uplink duration) of the transmission interval 400. In other examples, the duration of the transmission interval 400 may be predetermined or signaled prior to transmission of the preamble.

The time/frequency resource(s) over which the preamble is transmitted (i.e., a first CCA slot) may be protected from transmissions by wireless devices of other network operating entities. For example, an identifier (or identifiers) of the time/frequency resource(s) over which the preamble is transmitted (or an identifier (or identifiers) of the time/frequency resource(s) of the first CCA slot) may be shared with all network operating entities having wireless devices that may possibly access the transmission interval 400, so that wireless devices that do not have a highest priority for communicating over the radio frequency spectrum during the transmission interval 400 do not access the radio frequency spectrum band during the transmission interval 400.

Wireless devices of the second network operating entity and wireless devices of the third network operating entity may be configured to refrain from communicating over the radio frequency spectrum band, during the transmission interval 400, upon detecting the preamble transmitted by the wireless device(s) of the first network operating entity.

FIG. 4 illustrates a scenario in which one or more wireless devices of the first network operating entity transmit a preamble and communicate over the radio frequency spectrum band during the transmission interval 400. In a scenario in which no wireless device of the first operating entity transmits a preamble during the first CCA slot, or in a scenario in which a wireless device of the second network operating entity does not detect a preamble transmitted by a wireless device of the first network operating entity, one or more wireless devices of the second network operating entity may communicate over the radio frequency spectrum band during the transmission interval 400, as described with reference to FIG. 5.

Figure 5:
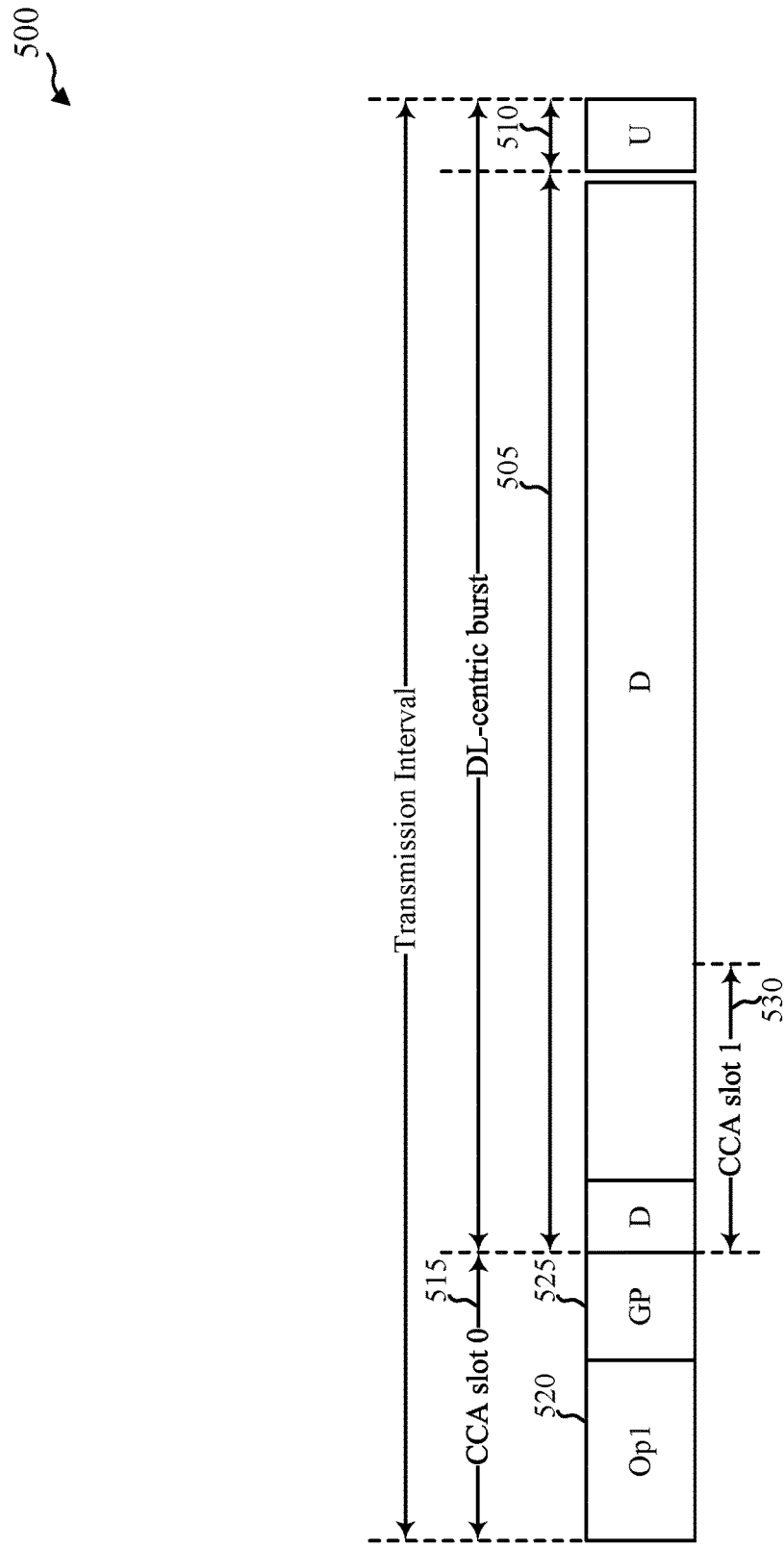
FIG. 5 shows a transmission scenario during a transmission interval of a radio frequency spectrum band, in accordance with various aspects of the present disclosure.

FIG. 5 shows a transmission scenario during a transmission interval 500 of a radio frequency spectrum band, in accordance with various aspects of the present disclosure. The radio frequency spectrum band may be shared by a plurality of network operating entities. In some examples, the transmission interval 500 may be one of the G-INT or O-INT sub-intervals described with reference to FIG. 3. By way of example, the transmission interval 500 is shown to include a DL-centric burst, in which a downlink transmission 505 is followed by a much shorter uplink transmission 510. Alternatively, the transmission interval 500 could include a purely downlink burst, a UL-centric burst, or some other combination of downlink and uplink transmissions.

For the transmission interval 500, the wireless devices (e.g., the network access devices or UEs) of a first network operating entity may have a highest priority for communicating over the radio frequency spectrum band, the wireless devices of a second network operating entity may have a second highest priority for communicating over the radio frequency spectrum band, and the wireless devices of a third network operating entity may have a third highest priority for communicating over the radio frequency spectrum band. In other transmission intervals, the relative priorities of the wireless devices of the network operating entities may be the same or different, as described, for example, with reference to FIG. 3. In some examples, the relative priorities of the wireless devices of different network operating entities may depend on a proximity of a transmission interval (e.g., the transmission interval 500) to a G-INT sub-interval of a network operating entity (e.g., in a first opportunistic transmission interval following a G-INT for the wireless devices of the third network operating entity, the wireless devices of the third network operating entity may have a lowest priority for accessing (or communicating over) the transmission interval). In general, the priority of the network operating entities on each transmission interval may be prearranged. The prearrangement can be done via an SAS server or through coordination among network operating entities.

FIG. 5 shows a first CCA slot 515 (e.g., CCA slot 0). The first CCA slot 515 may include a set of one or more time/frequency resources in a beginning portion of the transmission interval 500. One or more wireless devices of the first network operating entity may transmit a preamble during a preamble transmission portion 520 (e.g., Op1) of the first CCA slot 515, to indicate that the transmission interval 500 is reserved for communication by or with the wireless device(s) of the first network operating entity. The preamble may have a predefined format or structure. The time/frequency resource(s) of the first CCA slot 515 may be protected from transmissions by wireless devices of other network operating entities (e.g., wireless devices of the second network operating entity and the third network operating entity). In some examples, an identifier (or identifiers) of the time/frequency resource(s) of the first CCA slot 515 (or an identifier (or identifiers) of the time/frequency resource(s) of the first CCA slot 515) may be shared with all network operating entities having wireless devices that may possibly access the transmission interval 500, so that wireless devices that do not have a highest priority for communicating over the radio frequency spectrum during the transmission interval 500 do not access the radio frequency spectrum band during the transmission interval 500.

FIG. 5 assumes that no wireless device of the first network operating entity transmits a preamble during the first CCA slot 515. In some examples, wireless devices of the second network operating entity and the third network operating entity may monitor the radio frequency spectrum band during the preamble transmission portion 520 of the first CCA slot 515, and during a guard period (GP) 525 of the first CCA slot 515 following the preamble transmission portion 520 of the first CCA slot 515 may identify an absence of a preamble transmission in the first CCA slot 515 (e.g., determine that no preamble was transmitted in the first CCA slot 515). When desiring to communicate over the radio frequency spectrum band during the transmission interval 500, and based at least in part on identifying an absence of a preamble transmission during the first CCA slot 515, one or more wireless device(s) of the second network operating entity may communicate over the radio frequency spectrum band. During a second CCA slot 530 (e.g., CCA slot 1) of the transmission interval 500, the wireless device(s) of the second network operating entity may transmit a preamble over the radio frequency spectrum band. A preamble transmitted by a wireless device of the second network operating entity may have a predefined format or structure, which may be the same predefined format or structure used by wireless devices of the first network operating entity to transmit a preamble. In some examples, the preamble may signal a duration (e.g., a full duration, a remaining duration, a downlink duration, or an uplink duration) of the transmission interval 500. In other examples, the duration of the transmission interval 500 may be predetermined or signaled prior to transmission of the preamble.

The time/frequency resource(s) over which the preamble is transmitted (i.e., the second CCA slot 530) may be protected from transmissions by wireless devices of other network operating entities (e.g., wireless devices of the first network operating entity and the third network operating entity). For example, an identifier (or identifiers) of the time/frequency resource(s) over which the preamble is transmitted in the second CCA slot 530 (or an identifier (or identifiers) of the time/frequency resource(s) of the second CCA slot 530) may be shared with all network operating entities having wireless devices that may possibly access the transmission interval 500, so that wireless devices that do not have a second highest priority for communicating over the radio frequency spectrum during the transmission interval 500 do not access the radio frequency spectrum band during the transmission interval 500.

Wireless devices of the third network operating entity may be configured to refrain from communicating over the radio frequency spectrum band, during the transmission interval 500, upon detecting the preamble transmitted by the wireless device(s) of the second network operating entity. Wireless devices of the first network operating entity may refrain from communicating over the radio frequency spectrum band, during the transmission interval 500, because the wireless devices did not transmit a preamble over the radio frequency spectrum band in the first CCA slot 515 and/or upon detecting the preamble transmitted by the wireless device(s) of the second network operating entity in the second CCA slot 530.

FIG. 5 illustrates a scenario in which no wireless device of the first network operating entity transmits a preamble over the radio frequency spectrum band during the transmission interval 500, but one or more wireless devices of the second network operating entity transmits a preamble and communicate over the radio frequency spectrum band during the transmission interval 500. In a scenario in which no wireless device of the first network operating entity and no wireless device of the second network operating entity transmits a preamble during the first CCA slot 515 or second CCA slot 530, or in a scenario in which a wireless device of the third network operating entity does not detect a preamble transmitted by a wireless device of the first network operating entity or the second network operating entity, one or more wireless devices of the third network operating entity may communicate over the radio frequency spectrum band during the transmission interval 500, as described with reference to FIG. 6. In some examples, a network operating entity, upon detecting no transmission from any network operating entity with higher priority in the CCA slots corresponding to each higher priority network operating entity, may start transmission of a preamble or reservation signal in its own CCA slot, followed by its data transmission. The network operating entity may vacate the CCA slots of the lower priority network operating entities or can start data transmission right after its own CCA slot.

Figure 6:
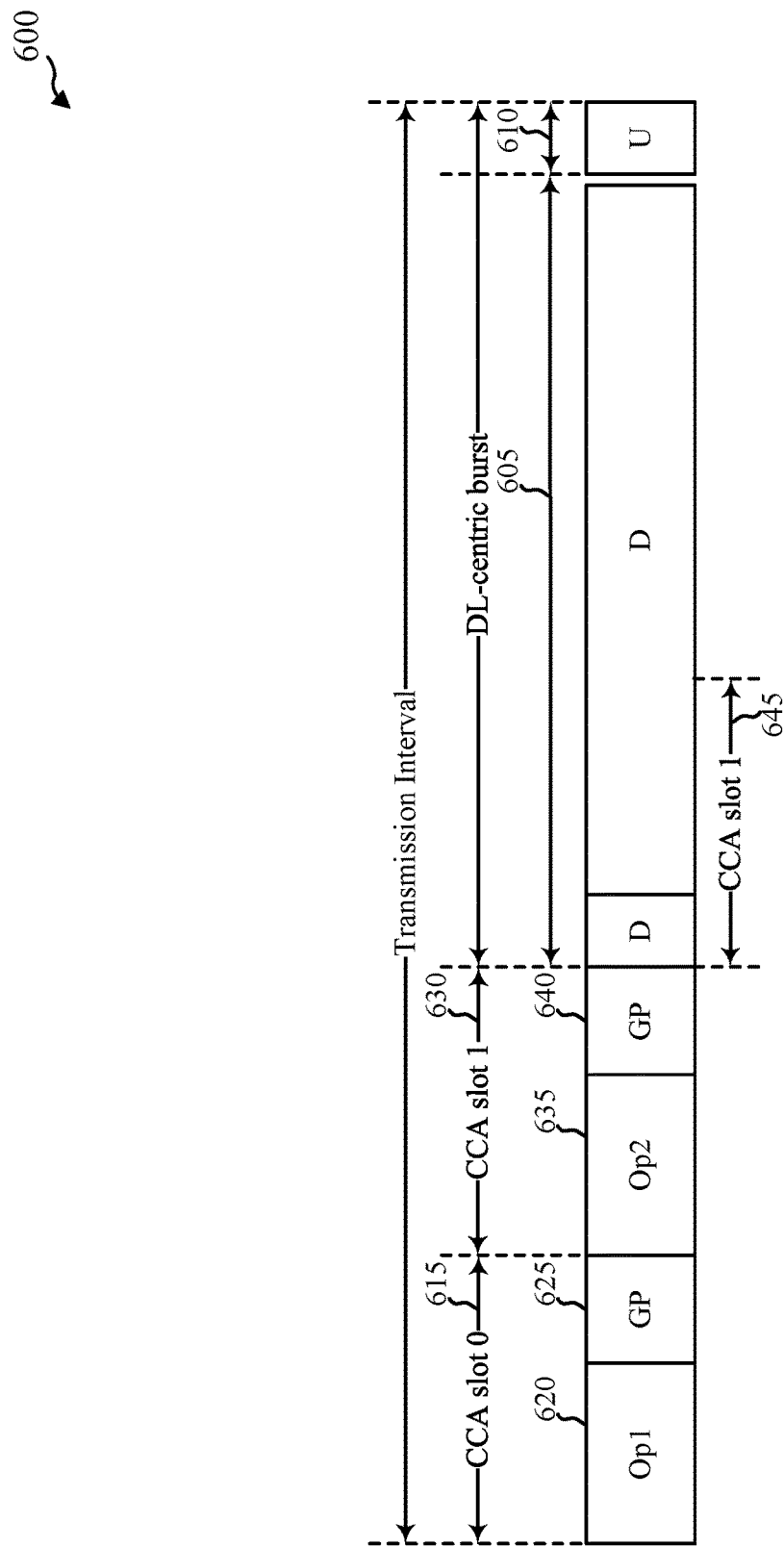
FIG. 6 shows a transmission scenario during a transmission interval of a radio frequency spectrum band, in accordance with various aspects of the present disclosure.

FIG. 6 shows a transmission scenario during a transmission interval 600 of a radio frequency spectrum band, in accordance with various aspects of the present disclosure. The radio frequency spectrum band may be shared by a plurality of network operating entities. In some examples, the transmission interval 600 may be one of the G-INT or O-INT sub-intervals described with reference to FIG. 3. By way of example, the transmission interval 600 is shown to include a DL-centric burst, in which a downlink transmission 605 is followed by a much shorter uplink transmission 610. Alternatively, the transmission interval 600 could include a purely downlink burst, a UL-centric burst, or some other combination of downlink and uplink transmissions.

For the transmission interval 600, the wireless devices (e.g., the network access devices or UEs) of a first network operating entity may have a highest priority for communicating over the radio frequency spectrum band, the wireless devices of a second network operating entity may have a second highest priority for communicating over the radio frequency spectrum band, and the wireless devices of a third network operating entity may have a third highest priority for communicating over the radio frequency spectrum band. In other transmission intervals, the relative priorities of the wireless devices of the network operating entities may be the same or different, as described, for example, with reference to FIG. 3. In some examples, the relative priorities of the wireless devices of different network operating entities may depend on a proximity of a transmission interval (e.g., the transmission interval 600) to a G-INT sub-interval of a network operating entity (e.g., in a first opportunistic transmission interval following a G-INT for the wireless devices of the third network operating entity, the wireless devices of the third network operating entity may have a lowest priority for accessing (or communicating over) the transmission interval). In general, the priority of the network operating entities on each transmission interval may be prearranged. The prearrangement can be done via an SAS server or through coordination among network operating entities.

FIG. 6 shows a first CCA slot 615 (e.g., CCA slot 0). The first CCA slot 615 may include a set of one or more time/frequency resources in a beginning portion of the transmission interval 600. One or more wireless devices of the first network operating entity may transmit a preamble during a preamble transmission portion 620 (e.g., Op1) of the first CCA slot 615, to indicate that the transmission interval 600 is reserved for communication by or with the wireless device(s) of the first network operating entity. The preamble may have a predefined format or structure. The time/frequency resource(s) of the first CCA slot 615 may be protected from transmissions by wireless devices of other network operating entities (e.g., wireless devices of the second network operating entity and the third network operating entity). In some examples, an identifier (or identifiers) of the time/frequency resource(s) of the first CCA slot 615 (or an identifier (or identifiers) of the time/frequency resource(s) of the first CCA slot 615) may be shared with all network operating entities having wireless devices that may possibly access the transmission interval 600, so that wireless devices that do not have a highest priority for communicating over the radio frequency spectrum during the transmission interval 600 do not access the radio frequency spectrum band during the transmission interval 600.

FIG. 6 assumes that no wireless device of the first network operating entity transmits a preamble during the first CCA slot 615. In some examples, wireless devices of the second network operating entity and the third network operating entity may monitor the radio frequency spectrum band during the preamble transmission portion 620 of the first CCA slot 615, and during a guard period (GP) 625 of the first CCA slot 615 following the preamble transmission portion 620 of the first CCA slot 615 may identify an absence of a preamble transmission in the first CCA slot 615 (e.g., determine that no preamble was transmitted in the first CCA slot 615). Based at least in part on identifying an absence of a preamble transmission during the first CCA slot 615, one or more wireless device(s) of the second network operating entity may communicate over the radio frequency spectrum band. When desiring to communicate over the radio frequency spectrum band during the transmission interval 600, and based at least in part on determining that no wireless device of the first network operating entity transmitted a preamble during the first CCA slot 615, one or more wireless devices of the second network operating entity may transmit a preamble over the radio frequency spectrum band during a preamble transmission portion 635 (e.g., Op2) of a second CCA slot 630 (e.g., CCA slot 1) of the transmission interval 600, to indicate that the transmission interval 600 is reserved for communication by or with the wireless device(s) of the first network operating entity. In some examples, the second CCA slot 630 may include a set of one or more time/frequency resources associated with a later time period than the time/frequency resources of the first CCA slot 615. A preamble transmitted by a wireless device of the second network operating entity may have a predefined format or structure, which may be the same predefined format or structure used by wireless devices of the first network operating entity to transmit a preamble.

The time/frequency resource(s) of the second CCA slot 630 may be protected from transmissions by wireless devices of other network operating entities (e.g., wireless devices of the first network operating entity and the third network operating entity). In some examples, an identifier (or identifiers) of the time/frequency resource(s) of the second CCA slot 630 (or an identifier (or identifiers) of the time/frequency resource(s) of the second CCA slot 630) may be shared with all network operating entities having wireless devices that may possibly access the transmission interval 600, so that wireless devices that do not have a second highest priority for communicating over the radio frequency spectrum during the transmission interval 600 do not access the radio frequency spectrum band during the transmission interval 600.

FIG. 6 assumes that no wireless device of the second network operating entity transmits a preamble during the second CCA slot 630. In some examples, wireless devices of the third network operating entity may monitor the radio frequency spectrum band during the preamble transmission portion 635 of the second CCA slot 630, and during a guard period (GP) 640 of the second CCA slot 630 following the preamble transmission portion 635 of the second CCA slot 630 may identify an absence of a preamble transmission in the second CCA slot 630 (e.g., determine that no preamble was transmitted in the second CCA slot 630). When desiring to communicate over the radio frequency spectrum band during the transmission interval 600, and based at least in part on identifying an absence of a preamble transmission during each of the first CCA slot 615 and the second CCA slot 630, one or more wireless device(s) of the third network operating entity may communicate over the radio frequency spectrum band. During a third CCA slot 645 (e.g., CCA slot 2) of the transmission interval 600, one or more wireless devices of the third network operating entity may transmit a preamble over the radio frequency spectrum band. Alternatively, a wireless device of the third network operating entity may not transmit a preamble (e.g., a wireless device of the third network operating entity may not transmit a preamble when it is known that the wireless devices of the third network operating entity has a lowest priority for accessing the transmission interval 600 and no other wireless device may attempt to access the radio frequency spectrum band for the transmission interval 600 following the wireless devices of the third network operating entity). When transmitted, a preamble transmitted by a wireless device of the third network operating entity may have a predefined format or structure, which may be the same predefined format or structure used by wireless devices of the first network operating entity or wireless devices of the second network operating entity to transmit a preamble. In some examples, the third CCA slot 645 may include a set of one or more time/frequency resources associated with a later time period than the time/frequency resources of the second CCA slot 630. In some examples, the preamble may signal a duration (e.g., a full duration, a remaining duration, a downlink duration, or an uplink duration) of the transmission interval 600. In other examples, the duration of the transmission interval 600 may be predetermined or signaled prior to transmission of the preamble.

The time/frequency resource(s) over which the preamble is transmitted (i.e., the third CCA slot 645) may be protected from transmissions by wireless devices of other network operating entities (e.g., wireless devices of the first network operating entity and the second network operating entity). For example, an identifier (or identifiers) of the time/frequency resource(s) over which the preamble is transmitted in the third CCA slot 645 (or an identifier (or identifiers) of the time/frequency resource(s) of the third CCA slot 645) may be shared with all network operating entities having wireless devices that may possibly access the transmission interval 600, so that wireless devices that do not have a third highest priority for communicating over the radio frequency spectrum during the transmission interval 600 do not access the radio frequency spectrum band during the transmission interval 600.

Wireless devices of the first network operating entity and wireless devices of the second network operating entity may refrain from communicating over the radio frequency spectrum band, during the transmission interval 600, because the wireless devices did not transmit a preamble over the radio frequency spectrum band in the first CCA slot 615 or second CCA slot 630, and/or upon detecting the preamble transmitted by the wireless device(s) of the third network operating entity in the third CCA slot 645. In this case, if the first network operating entity or the second network operating entity has data arrival to transmit during the transmission interval 600, it will wait until the subsequent transmission interval and perform medium access depending on its priority in the subsequent transmission interval (and transmit or not transmit accordingly).

In some examples, contention for access to a transmission interval (e.g., medium sensing for one of the G-INT or O-INT sub-intervals described with reference to FIG. 3) may be resolved using a protected RTS/CTS-based LBT procedure. A protected RTS/CTS-based LBT procedure may provide a CCA slot for each of a plurality of network operating entities. The CCA slots are protected in that a wireless device may only transmit a RTS message or a CTS message in a CCA slot if the wireless device is associated with a network operating entity to which the CCA slot is allocated. The CCA slots are also prioritized, such that the wireless devices of a network operating entity given a highest priority for accessing a transmission interval are given an opportunity to transmit a RTS message in a highest priority CCA slot, and if a wireless device of the network operating entity given the highest priority for accessing the transmission interval transmits a RTS message in the highest priority CCA slot, wireless devices of other network operating entities (that detect the RTS message or a corresponding CTS message) are not allowed to transmit a preamble in a lower priority CCA slot), and so on for each next highest priority level. Thus, in comparison to a protected preamble-based LBT procedure, in which a wireless device of a network operating entity associated with a lower priority will not attempt to access a radio frequency spectrum band for a transmission interval upon detecting a preamble of a higher priority wireless device in a higher priority CCA slot, a wireless device operating in accordance with a protected RTS/CTS-based LBT procedure will not attempt to access a radio frequency spectrum band for a transmission interval upon detecting either a RTS message or a CTS message of a higher priority wireless device in a higher priority CCA slot. In some examples, a protected RTS/CTS-based LBT procedure may provide better coordination between wireless devices involved in a hidden node scenario (e.g., when a node is within range of a receiving node but not a transmitting node, but is nonetheless affected by transmissions to the receiving node), as it involves the RTS and CTS transmission from both network access device and UE (hence both network access device to network access device detection and UE to network access device detection) while the protected preamble based LBT procedure relies on network access devices from one network operating entity being able to detect the preamble transmissions of network access devices of other network operating entities (i.e., only network access device to network access device detection).

Figure 7:
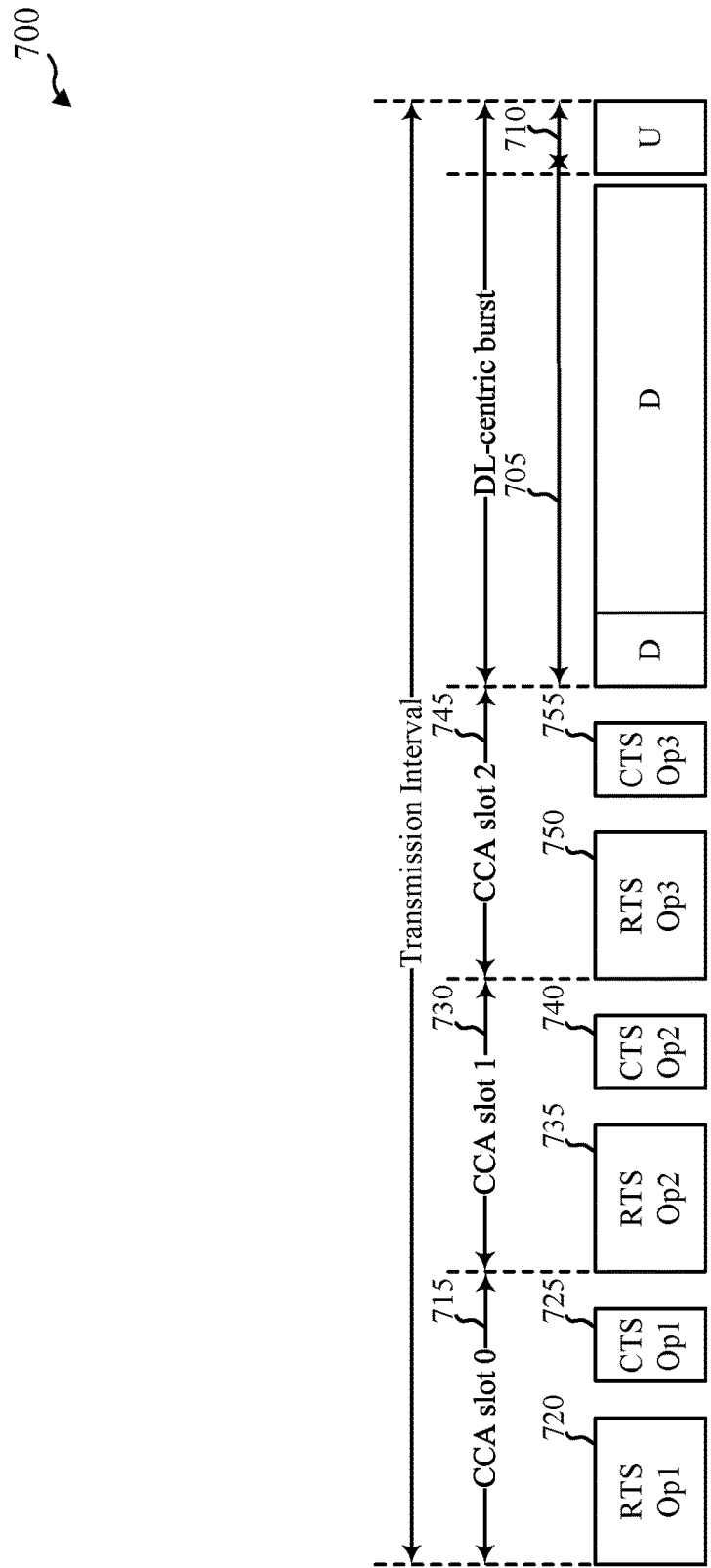
FIG. 7 shows a transmission scenario during a transmission interval of a radio frequency spectrum band, in accordance with various aspects of the present disclosure.

FIG. 7 shows a transmission scenario during a transmission interval 700 of a radio frequency spectrum band, in accordance with various aspects of the present disclosure. The radio frequency spectrum band may be shared by a plurality of network operating entities. In some examples, the transmission interval 700 may be one of the G-INT or O-INT sub-intervals described with reference to FIG. 3. By way of example, the transmission interval 700 is shown to include a DL-centric burst, in which a downlink transmission 705 is followed by a much shorter uplink transmission 710. Alternatively, the transmission interval 700 could include a purely downlink burst, a UL-centric burst, or some other combination of downlink and uplink transmissions.

For the transmission interval 700, the wireless devices (e.g., the network access devices or UEs) of a first network operating entity may have a highest priority for communicating over the radio frequency spectrum band, the wireless devices of a second network operating entity may have a second highest priority for communicating over the radio frequency spectrum band, and the wireless devices of a third network operating entity may have a third highest priority for communicating over the radio frequency spectrum band. In other transmission intervals, the relative priorities of the wireless devices of the network operating entities may be the same or different, as described, for example, with reference to FIG. 3. In some examples, the relative priorities of the wireless devices of different network operating entities may depend on a proximity of a transmission interval (e.g., the transmission interval 700) to a G-INT sub-interval of a network operating entity (e.g., in a first opportunistic transmission interval following a G-INT for the wireless devices of the third network operating entity, the wireless devices of the third network operating entity may have a lowest priority for accessing (or communicating over) the transmission interval). In general, the priority of the network operating entities on each transmission interval may be prearranged. The prearrangement can be done via an SAS server or through coordination among network operating entities.

FIG. 7 shows a first CCA slot 715 (e.g., CCA slot 0). The first CCA slot 715 may include a set of one or more time/frequency resources in a beginning portion of the transmission interval 700. One or more wireless devices of the first network operating entity may transmit a RTS message (or other form of reservation signal) during a RTS transmission opportunity 720 (e.g., RTS Op1) of the first CCA slot 715, to indicate that the transmission interval 700 is reserved for communication by or with the wireless device(s) of the first network operating entity. The RTS message may include a downlink preamble having a predefined format or structure, and a payload including one or more UE identifiers (IDs) and/or an identifier of a group of UEs.

In response to receiving the RTS message, a UE identified in the RTS message may transmit a CTS message during a CTS transmission opportunity 725 (e.g., CTS Op1) of the first CCA slot 715. The CTS message may include an uplink preamble having a predefined format or structure, and may optionally include a payload. The preambles included in the RTS message and CTS message may include the same waveform, and may be transmitted in a single frequency network (SFN) manner by all transmitting nodes. The payloads of the RTS message and CTS message may be transmitted in a non-SFN manner, and may be intended to be heard only by devices of the relevant network operating entity (e.g., the first network operating entity).

The time/frequency resource(s) of the first CCA slot 715 may be protected from transmissions by wireless devices of other network operating entities (e.g., wireless devices of the second network operating entity and the third network operating entity). In some examples, an identifier (or identifiers) of the time/frequency resource(s) of the first CCA slot 715 (or an identifier (or identifiers) of the time/frequency resource(s) of the first CCA slot 715) may be shared with all network operating entities having wireless devices that may possibly access the transmission interval 700, so that wireless devices that do not have a highest priority for communicating over the radio frequency spectrum during the transmission interval 700 do not access the radio frequency spectrum band during the transmission interval 700.

FIG. 7 assumes that no wireless device of the first network operating entity transmits a RTS message during the first CCA slot 715. In some examples, wireless devices of the second network operating entity and the third network operating entity may monitor the radio frequency spectrum band during the first CCA slot 715, and during the first CCA slot 715 (or during a guard period following the first CCA slot 715 (not shown)) may identify an absence of a RTS message or a CTS message in the first CCA slot 715 (e.g., determine that no RTS message or CTS message was transmitted in the first CCA slot 715). Based at least in part on identifying an absence of a RTS message or a CTS message during the first CCA slot 715, one or more wireless device(s) of the second network operating entity may communicate over the radio frequency spectrum band. When desiring to communicate over the radio frequency spectrum band during the transmission interval 700, and based at least in part on determining that no wireless device of the first network operating entity transmitted a preamble during the first CCA slot 715, one or more wireless devices of the second network operating entity may transmit a RTS message over the radio frequency spectrum band during a RTS transmission opportunity 735 (e.g., RTS Op2) of a second CCA slot 730 (e.g., CCA slot 1) of the transmission interval 700, to indicate that the transmission interval 700 is reserved for communication by or with the wireless device(s) of the first network operating entity. A wireless device that transmits a RTS message may also receive a CTS message over the radio frequency spectrum band during a CTS transmission opportunity 740 (e.g., CTS Op2) of the second CCA slot 730. In some examples, the second CCA slot 730 may include a set of one or more time/frequency resources associated with a later time period than the time/frequency resources of the first CCA slot 715. A RTS message transmitted by a wireless device of the second network operating entity may take the same form as a RTS message transmitted by a wireless device of the first network operating entity. A CTS message received by a wireless device of the second network operating entity may take the same form as a CTS message received by a wireless device of the first network operating entity.

The time/frequency resource(s) of the second CCA slot 730 may be protected from transmissions by wireless devices of other network operating entities (e.g., wireless devices of the first network operating entity and the third network operating entity). In some examples, an identifier (or identifiers) of the time/frequency resource(s) of the second CCA slot 730 (or an identifier (or identifiers) of the time/frequency resource(s) of the second CCA slot 730) may be shared with all network operating entities having wireless devices that may possibly access the transmission interval 700, so that wireless devices that do not have a second highest priority for communicating over the radio frequency spectrum during the transmission interval 700 do not access the radio frequency spectrum band during the transmission interval 700. In another example, the time/frequency resource(s) of the second CCA slot 730 may be protected from transmissions by wireless devices of other network operating entities with lower priority (e.g., wireless devices of the third network operating entity) so that wireless devices that do not have a second highest priority for communicating over the radio frequency spectrum during the transmission interval 700 do not access the radio frequency spectrum band during the transmission interval 700. In some examples, a network operating entity, upon detecting no transmission from any network operating entity with higher priority in the CCA slots corresponding to each higher priority network operating entity, may start transmission of a preamble or reservation signal in its own CCA slot, followed by its data transmission. The network operating entity may vacate the CCA slots of the lower priority network operating entities or can start data transmission right after its own CCA slot.

FIG. 7 assumes that no wireless device of the second network operating entity transmits a RTS message during the second CCA slot 730. In some examples, wireless devices of the third network operating entity may monitor the radio frequency spectrum band during the second CCA slot 730, and during the second CCA slot 730 (or during a guard period following the second CCA slot 730 (not shown)) may identify an absence of a RTS message or a CTS message in the second CCA slot 730 (e.g., determine that no RTS message or CTS message was transmitted tin the second CCA slot 730). When desiring to communicate over the radio frequency spectrum band during the transmission interval 700, and based at least in part on identifying an absence of a RTS message or a CTS message during each of the first CCA slot 715 and the second CCA slot 730, one or more wireless device(s) of the third network operating entity may communicate over the radio frequency spectrum band. During a third CCA slot 745 (e.g., CCA slot 2) of the transmission interval 700, one or more wireless devices of the third network operating entity may transmit a RTS message over the radio frequency spectrum band during a RTS transmission opportunity 750 (e.g., RTS Op3) of the third CCA slot 745. A wireless device that transmits a RTS message may also receive a CTS message over the radio frequency spectrum band during a CTS transmission opportunity 755 (e.g., CCA Op3) of the third CCA slot 745. In some examples, the third CCA slot 745 may include a set of one or more time/frequency resources associated with a later time period than the time/frequency resources of the second CCA slot 730. A RTS message transmitted by a wireless device of the third network operating entity may take the same form as a RTS message or 735 transmitted by a wireless device of the first network operating entity or the second network operating entity. A CTS message received by a wireless device of the third network operating entity may take the same form as a CTS message or 740 received by a wireless device of the first network operating entity or the second network operating entity. In some examples, the RTS message may signal a duration (e.g., a full duration, a remaining duration, a downlink duration, or an uplink duration) of the transmission interval 700. In other examples, the duration of the transmission interval 700 may be predetermined or signaled prior to transmission of the RTS message or in the RTS message. In addition, the duration of the transmission interval may also be signaled prior to the transmission of the CTS message or in the CTS message.

The time/frequency resource(s) over which the RTS message or CTS message is transmitted (i.e., the third CCA slot 745) may be protected from transmissions by wireless devices of other network operating entities (e.g., wireless devices of the first network operating entity and the second network operating entity). For example, an identifier (or identifiers) of the time/frequency resource(s) over which the CTS message and RTS message are transmitted in the third CCA slot 745 (or an identifier (or identifiers) of the time/frequency resource(s) of the third CCA slot 745) may be shared with all network operating entities having wireless devices that may possibly access the transmission interval 700, so that wireless devices that do not have a third highest priority for communicating over the radio frequency spectrum during the transmission interval 700 do not access the radio frequency spectrum band during the transmission interval 700. In another example, the time/frequency resource(s) over which the RTS message or CTS message is transmitted (i.e., the third CCA slot 745) may be protected from transmissions by wireless devices of other network operating entities with lower priority. For example, a network operating entity, upon detecting no RTS/CTS message transmission from a higher priority network operating entity, may start RTS/CTS message transmission in its own CCA slot, followed by a data transmission.

Wireless devices of the first network operating entity and wireless devices of the second network operating entity may refrain from communicating over the radio frequency spectrum band, during the transmission interval 700, because the wireless devices did not transmit a RTS over the radio frequency spectrum band in the first CCA slot 715 or the second CCA slot 730, and/or upon detecting the RTS or CTS transmitted by the wireless device(s) of the third network operating entity in the third CCA slot 745. In this case, if the first network operating entity or second network operating entity has data to transmit during the transmission interval 600, it will wait until the subsequent transmission interval and perform medium access depending on its priority in the subsequent transmission interval (and transmit or not transmit accordingly).

Although each of the transmission intervals 400, 500, 600, and 700 described with reference to FIGS. 4-7 is associated with the same priority of network operating entities, the priority of network operating entities may differ for different transmission intervals (e.g., to ensure that the wireless devices of different network operating entities have fair access to the radio frequency spectrum band, or to provide the wireless devices of different network operating entities with more or less access to the radio frequency spectrum band).

Figure 8:
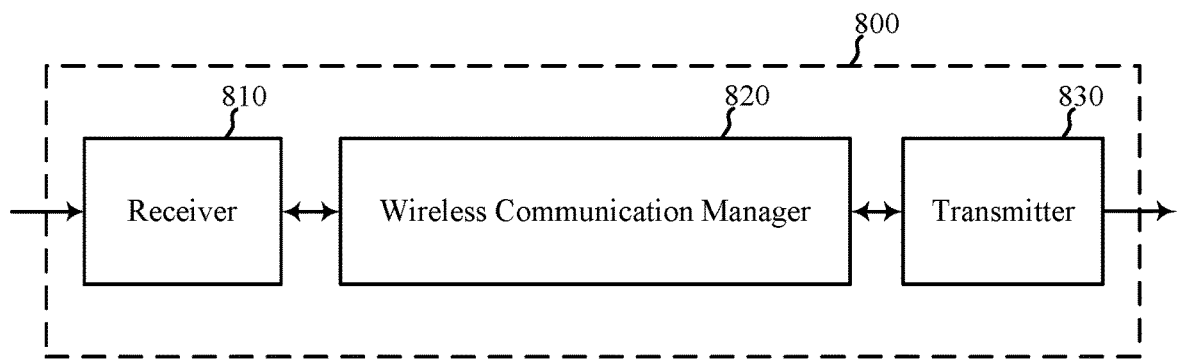
FIG. 8 shows a block diagram of a wireless device that supports accessing a radio frequency spectrum band using a coordinated LBT procedure, in accordance with various aspects of the present disclosure.

FIG. 8 shows a block diagram of a wireless device 800 that supports accessing a radio frequency spectrum band using a coordinated LBT procedure, in accordance with various aspects of the present disclosure. The radio frequency spectrum band may be shared by a plurality of network operating entities. The wireless device 800 may be an example of aspects of a network access device 105 or UE 115 described with reference to FIG. 1 or 2. The wireless device 800 may include a receiver 810, a wireless communication manager 820, and a transmitter 830. The wireless device 800 may also include a processor. Each of these components may be in communication with each other.

The receiver 810 may receive signals or information such as reference signals, packets, user data, or control information associated with various signaling or information channels (e.g., control channels, data channels, etc.). Received information may be passed to other components of the wireless device 800, including the wireless communication manager 820. The receiver 810 may be an example of aspects of the transceiver 1125 or 1225 described with reference to FIG. 11 or 12. The receiver 810 may include or be associated with a single antenna or a plurality of antennas.

The wireless communication manager 820 may be used to manage one or more aspects of wireless communication for the wireless device 800. In some examples, part of the wireless communication manager 820 may be incorporated into or shared with the receiver 810 or the transmitter 830. In some examples, the wireless communication manager 820 may be used to manage the performance of a coordinated LBT procedure (e.g., a LBT procedure coordinated with the wireless devices of one or more network operating entities other than the network operating entity with which the wireless device 800 is associated. In some examples, the coordinated LBT procedure may include the coordinated LBT procedure described with reference to FIGS. 4-7 or the coordinated LBT procedure described with reference to FIG. 8.

The transmitter 830 may transmit signals or information received from other components of the wireless device 800, including the wireless communication manager 820, such as reference signals, packets, user data, or control information associated with various signaling or information channels (e.g., control channels, data channels, etc.). In some examples, the transmitter 830 may be collocated with the receiver 810 in a transceiver. The transmitter 830 may be an example of aspects of the transceiver 1125 or 1225 described with reference to FIG. 11 or 12. The transmitter 830 may include or be associated with a single antenna or a plurality of antennas.

Figure 9:
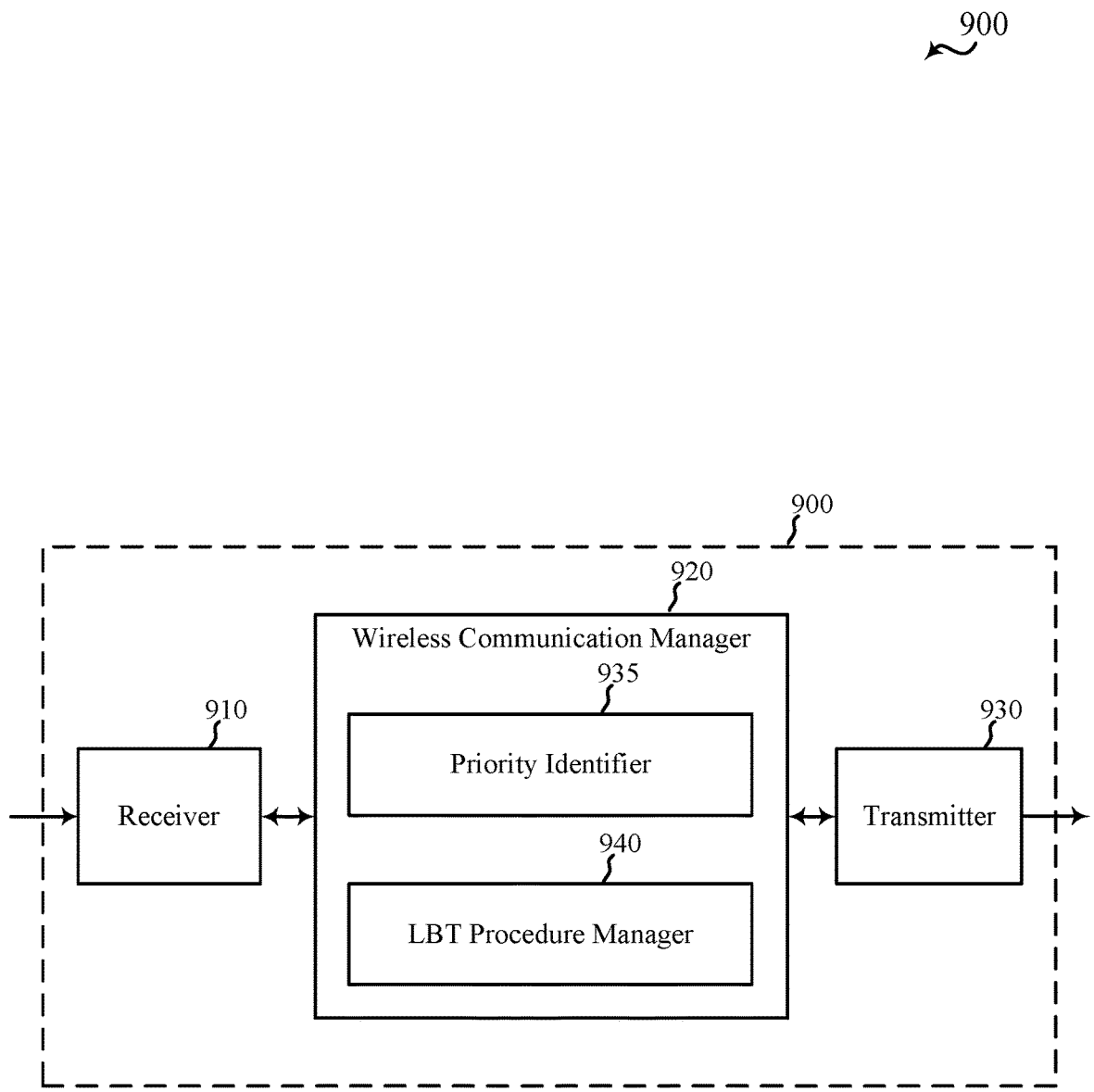
FIG. 9 shows a block diagram of a wireless device that supports accessing a radio frequency spectrum band using a coordinated LBT procedure, in accordance with various aspects of the present disclosure.

FIG. 9 shows a block diagram of a wireless device 900 that supports accessing a radio frequency spectrum band using a coordinated LBT procedure, in accordance with various aspects of the present disclosure. The radio frequency spectrum band may be shared by a plurality of network operating entities. The wireless device 900 may be an example of aspects of a network access device 105, UE 115, or wireless device 800 described with reference to FIG. 1, 2, or 8. The wireless device 900 may include a receiver 910, a wireless communication manager 920, and a transmitter 930. The wireless device 900 may also include a processor. Each of these components may be in communication with each other.

The receiver 910 may receive signals or information that may be passed to other components of the wireless device 900, including the wireless communication manager 920. The receiver 910 may also perform the functions described with reference to the receiver 810 of FIG. 8. The receiver 910 may be an example of aspects of the transceiver 1125 or 1225 described with reference to FIG. 11 or 12. The receiver 910 may include or be associated with a single antenna or a plurality of antennas.

The wireless communication manager 920 may be an example of aspects of the wireless communication manager 820 described with reference to FIG. 8. The wireless communication manager 920 may include a priority identifier 935 and a LBT procedure manager 940. The wireless communication manager 920 may be an example of aspects of the wireless communication manager 1105 or 1205 described with reference to FIG. 11 or 12.

The priority identifier 935 may be used to identify a priority of the wireless device 900 for a transmission interval of a radio frequency spectrum band. The radio frequency spectrum band may be shared by a plurality of network operating entities, as described with reference to FIGS. 3-7. The LBT procedure manager 940 may be used to identify an absence of a predetermined transmission type in each of a number of CCA slots of the transmission interval. Each of the number of CCA slots may be associated with a higher priority than the identified priority of the wireless device 900, as described with reference to FIGS. 3-7. In some examples, the predetermined transmission type may include at least one of a preamble, a reservation message, an RTS message, an acknowledgement message, a CTS message, or a combination thereof. The wireless communication manager 920 may be used to communicate over the radio frequency spectrum band based at least in part on the identified absence of the predetermined transmission type in each of the number of CCA slots associated with the higher priority than the priority of the wireless device 900, as described with reference to FIGS. 3-7.

The transmitter 930 may transmit signals or information received from other components of the wireless device 900, including the wireless communication manager 920. In some examples, the transmitter 930 may be collocated with the receiver 910 in a transceiver. The transmitter 930 may be an example of aspects of the transceiver 1125 or 1225 described with reference to FIG. 11 or 12. The transmitter 930 may include or be associated with a single antenna or a plurality of antennas.

Figure 10:
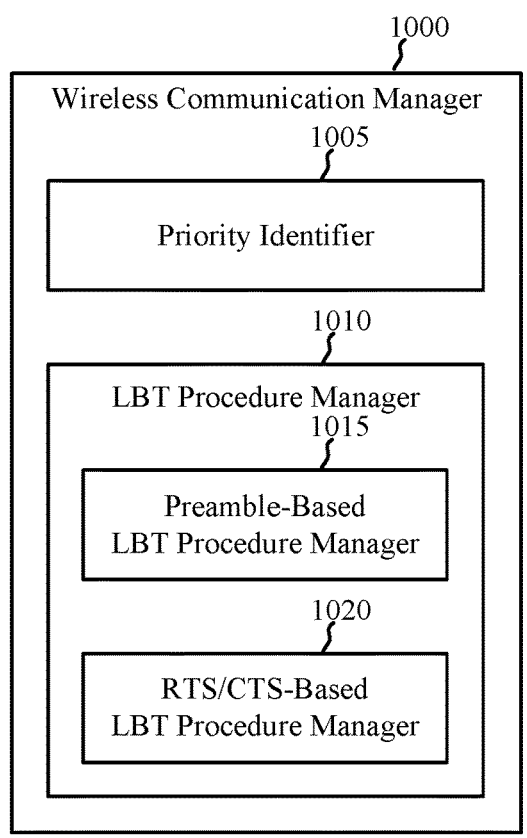
FIG. 10 shows a block diagram of a wireless communication manager that supports accessing a radio frequency spectrum band using a coordinated LBT procedure, in accordance with various aspects of the present disclosure.

FIG. 10 shows a block diagram of a wireless communication manager 1000 that supports accessing a radio frequency spectrum band using a coordinated LBT procedure, in accordance with various aspects of the present disclosure. The radio frequency spectrum band may be shared by a plurality of network operating entities. The wireless communication manager 1000 may be an example of aspects of the wireless communication manager 820 or 920 described with reference to FIG. 8 or 9.

The wireless communication manager 1000 may include a priority identifier 1005 and a LBT procedure manager 1010. The LBT procedure manager 1010 may include a preamble-based LBT procedure manager 1015 and/or a RTS/CTS-based LBT procedure manager 1020. Each of these components may communicate, directly or indirectly, with one another (e.g., via one or more buses).

The priority identifier 1005 may be used to identify a priority of a wireless device including the wireless communication manager 1000 for a transmission interval of a radio frequency spectrum band. The radio frequency spectrum band may be shared by a plurality of network operating entities, as described with reference to FIGS. 3-7.

The LBT procedure manager 1010 may optionally be used to monitor the radio frequency spectrum band during each of a number of CCA slots of the transmission interval. Each of the number of CCA slots may be associated with a higher priority than the identified priority of the wireless device, as described above with reference to FIGS. 3-7. The LBT procedure manager 1010 may also be used to identify an absence of a predetermined transmission type in each of the number of CCA slots, as described with reference to FIGS. 3-7. In some examples, the predetermined transmission type may include at least one of a preamble, a reservation message, an RTS message, an acknowledgement message, a CTS message, or a combination thereof.

The wireless communication manager 1000 may be used to communicate over the radio frequency spectrum band based at least in part on the identified absence of the predetermined transmission type in each of the number of CCA slots associated with the higher priority than the priority of the wireless device including the wireless communication manager 1000, as described with reference to FIGS. 3-7. Communicating over the radio frequency band may include transmitting or receiving data over the radio frequency spectrum band.

The preamble-based LBT procedure manager 1015 may optionally be used to transmit a preamble over the radio frequency spectrum band. The preamble may be transmitted in a CCA slot of the transmission interval. The CCA slot may be associated with the priority of the wireless device including the wireless communication manager 1000. In some examples, a length of the transmission interval may be signaled in the preamble.

The RTS/CTS-based LBT procedure manager 1020 may optionally be used to transmit a reservation message (e.g., a RTS message) over the radio frequency spectrum band. The reservation message may be transmitted in a CCA slot of the transmission interval. The CCA slot may be associated with the priority of the wireless device including the wireless communication manager 1000. In some examples, a length of the transmission interval may be signaled in the RTS message and/or in the CTS message. The RTS/CTS-based LBT procedure manager 1020 may also be used to detect, in the CCA slot, an acknowledgement message (e.g., a CTS message) transmitted over the radio frequency spectrum band in response to the reservation message. In some examples, the wireless communication manager 1000 may be used to transmit or receive data over the radio frequency spectrum band, during the transmission interval, based at least in part on the detecting of the acknowledgement message, as described above with reference to FIGS. 3-7.

In some examples, the priority identifier 1005 may be used to identify a priority of a wireless device including the wireless communication manager 1000 for a second transmission interval of the radio frequency spectrum band. The second priority may be the same as, or different from, the priority of the wireless device for a first transmission interval, as described with reference to FIGS. 3-7. The LBT procedure manager 1010 may perform a LBT procedure for the second transmission interval (and other transmission intervals) similarly to how a LBT procedure is performed for the first transmission interval, and some cases may communicate over the radio frequency spectrum band during the second transmission interval (or other transmission intervals).

Figure 11:
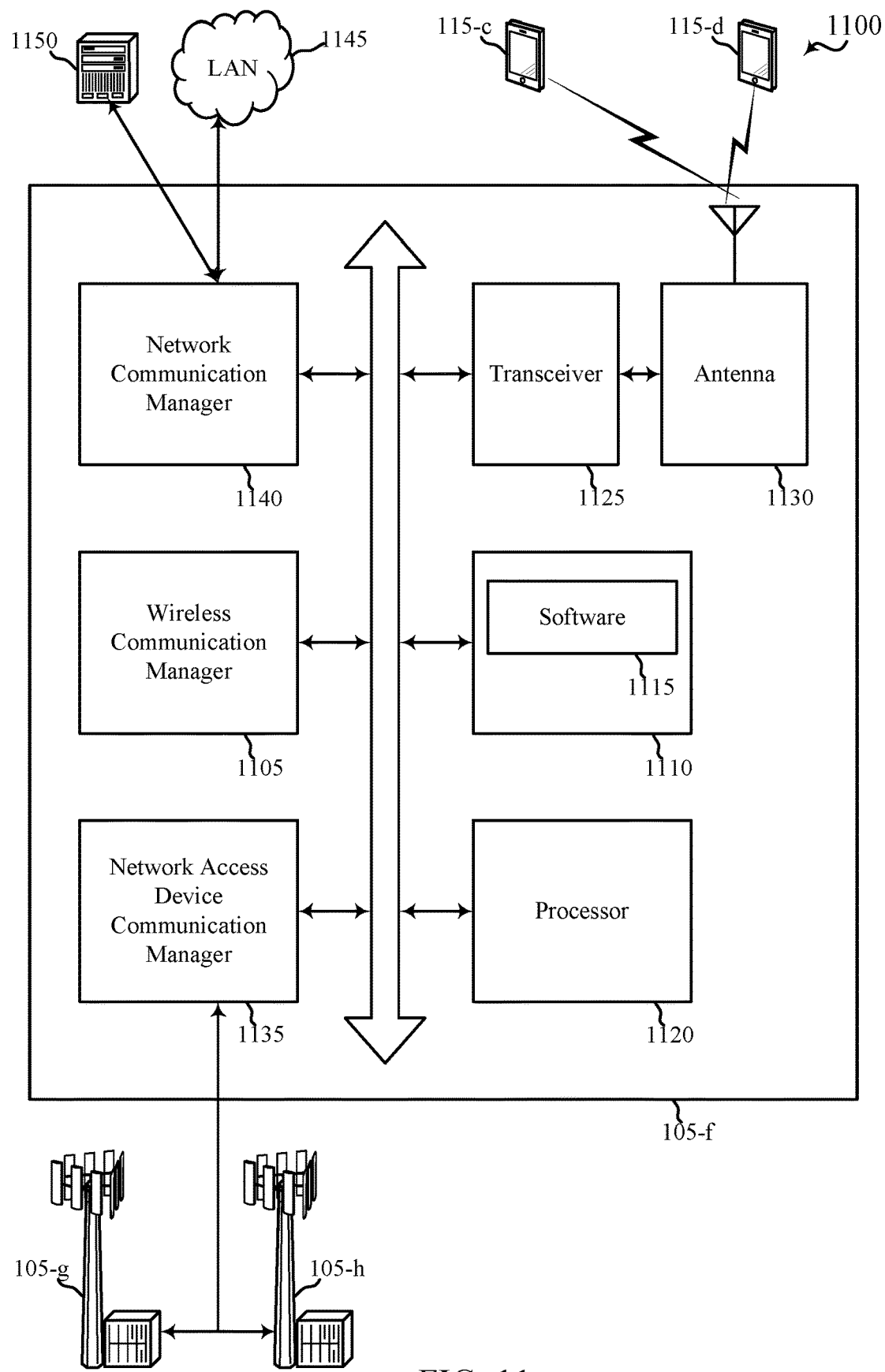
FIG. 11 shows a diagram of a wireless communication system including a wireless device that supports accessing a radio frequency spectrum band using a coordinated LBT procedure, in accordance with various aspects of the present disclosure.

FIG. 11 shows a diagram of a wireless communication system 1100 including a wireless device that supports accessing a radio frequency spectrum band using a coordinated LBT procedure, in accordance with various aspects of the present disclosure. The radio frequency spectrum band may be shared by a plurality of network operating entities. In some examples, the wireless communication system 1100 may include a network access device 105-*f*, which may be an example of aspects of a network access device 105 or wireless device 800 or 900 described with reference to FIG. 1, 2, 8, or 9. The network access device 105-*f* may include components for bi-directional voice and data communication, including components for transmitting communications and components for receiving communications. In some examples, the network access device 105-*f* may communicate bi-directionally with one or more UEs 115.

The network access device 105-*f* may include a wireless communication manager 1105, memory 1110, a processor 1120, a transceiver 1125, an antenna 1130, a network access device communication manager 1135, and a network communication manager 1140. Each of these components may communicate, directly or indirectly, with one another (e.g., via one or more buses). The wireless communication manager 1105 may be an example of the wireless communication manager 820, 920, or 1000 described with reference to FIG. 8, 9, or 10.

The memory 1110 may include random access memory (RAM) or read only memory (ROM). The memory 1110 may store computer-readable, computer-executable software 1115 including instructions that, when executed, cause the processor 1120 to perform various functions described herein (e.g., performing a coordinated LBT procedure to access a radio frequency spectrum band shared by a plurality of network operating entities, etc.). In some cases, the software 1115 may not be directly executable by the processor 1120 but may cause the processor 1120 (e.g., when compiled and executed) to perform functions described herein. The processor 1120 may include an intelligent hardware device, (e.g., a central processing unit (CPU), a microcontroller, an application specific integrated circuit (ASIC), etc.).

The transceiver 1125 may communicate bi-directionally, via one or more antennas or wired links, with one or more networks, as described herein. For example, the transceiver 1125 may communicate bi-directionally with UEs 115-c and 115-d. The transceiver 1125 may also include a modem to modulate packets and provide the modulated packets to the antennas for transmission, and to demodulate packets received from the antennas. In some cases, the network access device 105-f may include a single antenna 1130. However, in some cases the network access device 105-f may have more than one antenna 1130, which may be capable of concurrently transmitting or receiving multiple wireless transmissions.

The network access device communication manager 1135 may manage communications with other network access devices, such as network access devices 105-g and 105-h, and may include a controller or scheduler for controlling communications with UEs 115. In some examples, the network access device communication manager 1135 may provide an X2 interface to provide communication between network access devices 105.

The network communication manager 1140 may manage communications with a LAN 1145 or CN 1150 (e.g., via one or more wired or wireless links). For example, the network communication manager 1140 may manage the transfer of data between the UE 115-c or 115-d and the LAN 1145 or CN 1150.

Figure 12:
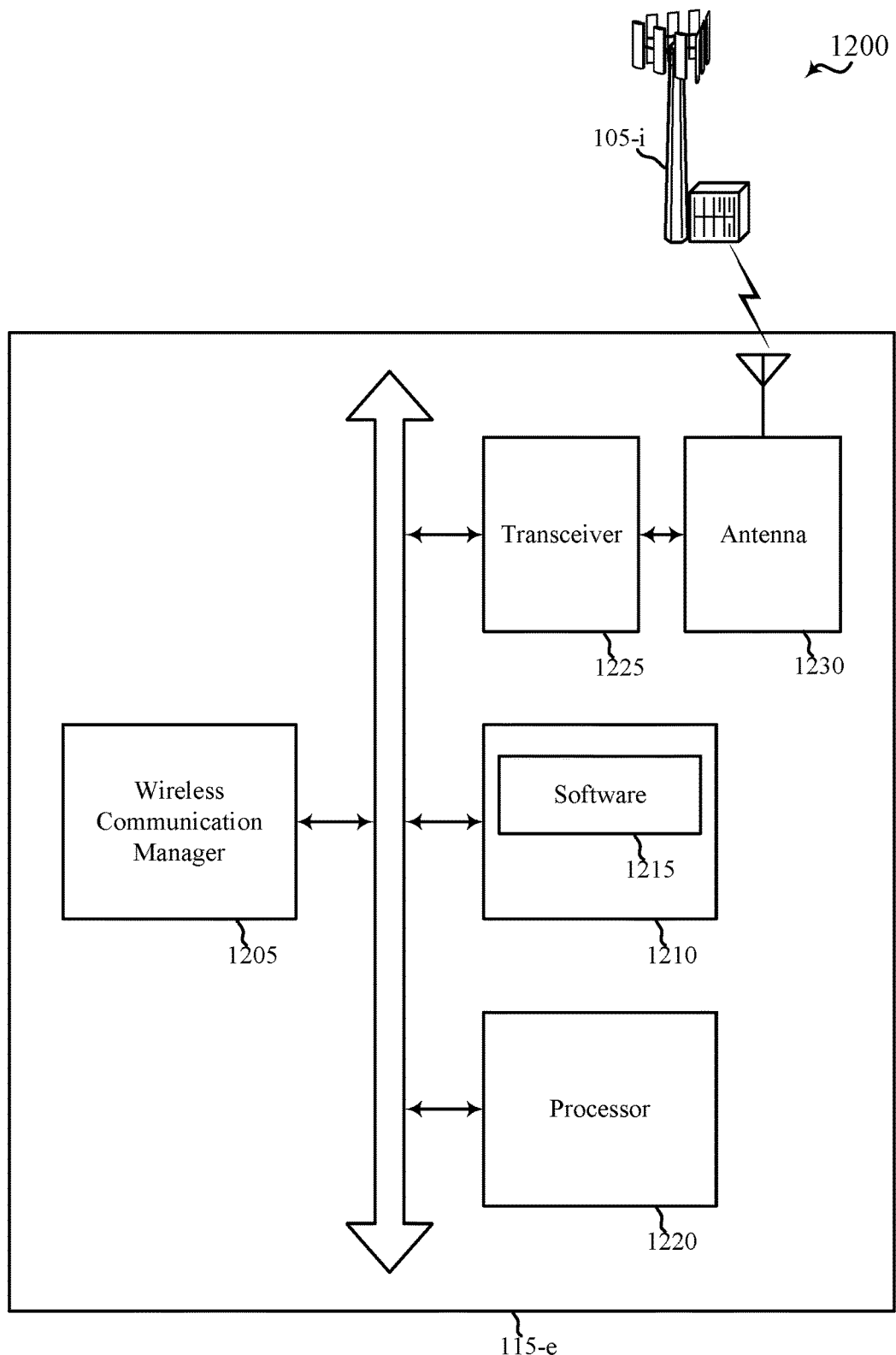
FIG. 12 shows a diagram of a wireless communication system including a wireless device that supports accessing a radio frequency spectrum band using a coordinated LBT procedure, in accordance with various aspects of the present disclosure.

FIG. 12 shows a diagram of a wireless communication system 1200 including a wireless device that supports accessing a radio frequency spectrum band using a coordinated LBT procedure, in accordance with various aspects of the present disclosure. The radio frequency spectrum band may be shared by a plurality of network operating entities. In some examples, the wireless communication system 1200 may include a UE 115-e, which may be an example of aspects of a UE 115 or wireless device 800 or 900 described with reference to FIG. 1, 2, 8, or 9.

The UE 115-e may include a wireless communication manager 1205, memory 1210, a processor 1220, a transceiver 1225, and an antenna 1230. Each of these components may communicate, directly or indirectly, with one another (e.g., via one or more buses). The wireless communication manager 1205 may be an example of the wireless communication manager 820, 920, or 1000 described with reference to FIG. 8, 9, or 10.

The memory 1210 may include RAM or ROM. The memory 1210 may store computer-readable, computer-executable software 1215 including instructions that, when executed, cause the processor 1220 to perform various functions described herein (e.g., performing a coordinated LBT procedure to access a radio frequency spectrum band shared by a plurality of network operating entities, etc.). In some cases, the software 1215 may not be directly executable by the processor 1220 but may cause the processor 1220 (e.g., when compiled and executed) to perform functions described herein. The processor 1220 may include an intelligent hardware device, (e.g., a CPU, a microcontroller, an ASIC, etc.).

The transceiver 1225 may communicate bi-directionally, via one or more antennas or wired links, with one or more networks, as described herein. For example, the transceiver 1225 may communicate bi-directionally with a network access device 105-i. The transceiver 1225 may also communicate bi-directionally with another UE. The transceiver 1225 may also include a modem to modulate packets and provide the modulated packets to the antennas for transmission, and to demodulate packets received from the antennas. In some cases, the UE 115-e may include a single antenna 1230. However, in some cases the UE 115-e may have more than one antenna 1230, which may be capable of concurrently transmitting or receiving multiple wireless transmissions.

Figure 13:
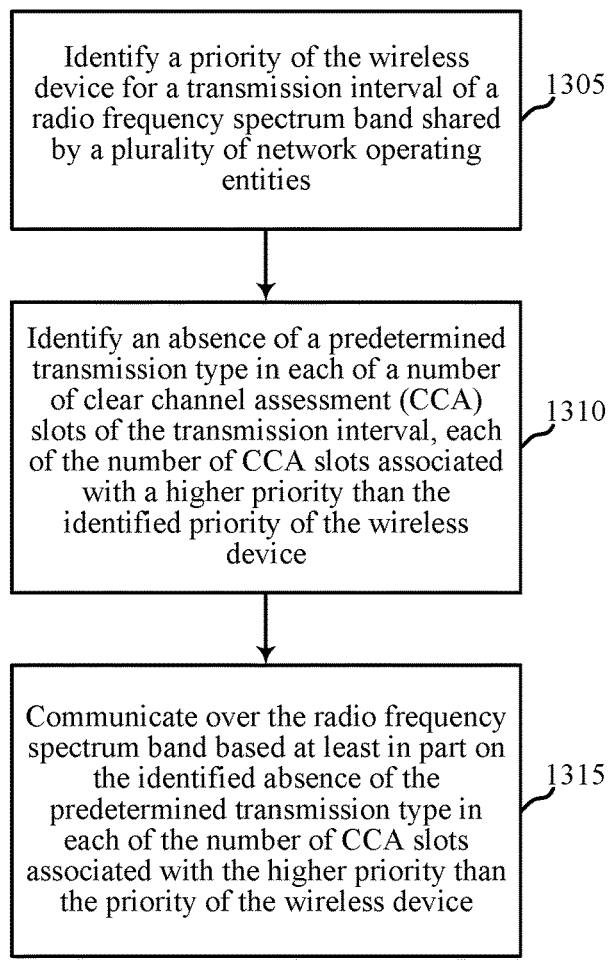
FIG. 13 shows a flowchart illustrating a method for wireless communication at a wireless device, in accordance with various aspects of the present disclosure.

FIG. 13 shows a flowchart illustrating a method 1300 for wireless communication at a wireless device, in accordance with various aspects of the present disclosure. The operations of method 1300 may be performed by a network access device 105, a UE 115, a wireless device 800 or 900 or its components, as described with reference to FIGS. 1-12. In some examples, the operations of method 1300 may be performed by the wireless communication manager described with reference to FIG. 1, 8, 9, 10, 11, or 12. In some examples, a wireless device may execute a set of codes to control the functional elements of the wireless device to perform the functions described below. Additionally or alternatively, a wireless device may perform aspects of the functions described below using special-purpose hardware.

At block 1305, a wireless device may identify its priority for a transmission interval of a radio frequency spectrum band. The radio frequency spectrum band may be shared by a plurality of network operating entities, as described with reference to FIGS. 3-7. In certain examples, the operations of block 1305 may be performed using the priority identifier described with reference to FIG. 9 or 10.

At block 1310, the wireless device may identify an absence of a predetermined transmission type in each of a number of CCA slots of the transmission interval. Each of the number of CCA slots may be associated with a higher priority than the identified priority of the wireless device, as described with reference to FIGS. 3-7. In some examples, the predetermined transmission type may include at least one of a preamble, a reservation message, an RTS message, an acknowledgement message, a CTS message, or a combination thereof. In certain examples, the operations of block 1310 may be performed using the LBT procedure manager described with reference to FIG. 9 or 10.

At block 1315, the wireless device may communicate over the radio frequency spectrum band based at least in part on the identified absence of the predetermined transmission type in each of the number of CCA slots associated with the higher priority than the priority of the wireless device, as described with reference to FIGS. 3-7. In certain examples, the operations of block 1315 may be performed using the wireless communication manager described with reference to FIG. 1, 8, 9, 10, 11, or 12.

Figure 14:
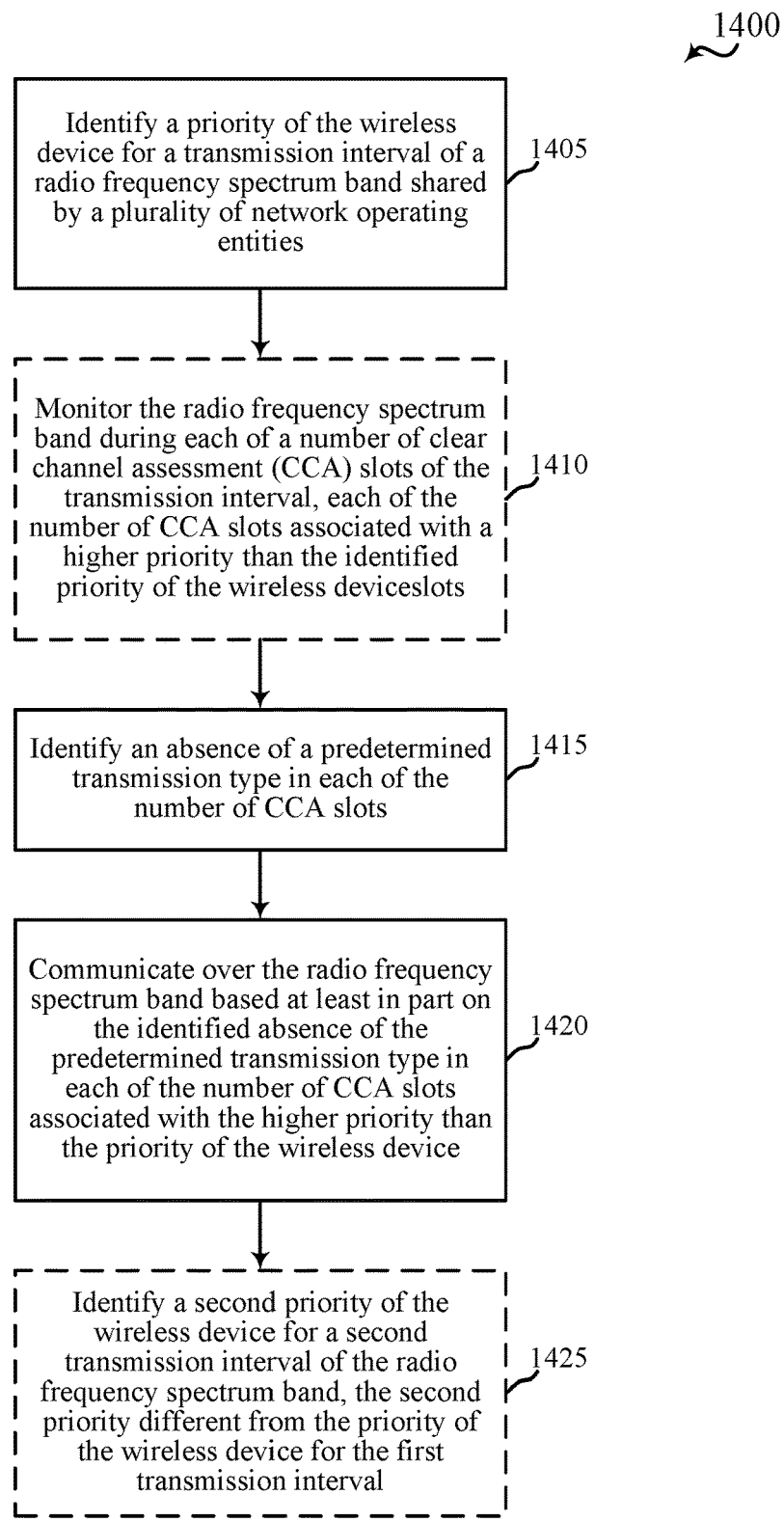
FIG. 14 shows a flowchart illustrating a method for wireless communication at a wireless device, in accordance with various aspects of the present disclosure.

FIG. 14 shows a flowchart illustrating a method 1400 for wireless communication at a wireless device, in accordance with various aspects of the present disclosure. The operations of method 1400 may be performed by a network access device 105, a UE 115, a wireless device 800 or 900 or its components, as described with reference to FIGS. 1-12. In some examples, the operations of method 1400 may be performed by the wireless communication manager described with reference to FIG. 1, 8, 9, 10, 11, or 12. In some examples, a wireless device may execute a set of codes to control the functional elements of the wireless device to perform the functions described below. Additionally or alternatively, a wireless device may perform aspects of the functions described below using special-purpose hardware.

At block 1405, a wireless device may identify its priority for a transmission interval of a radio frequency spectrum band. The radio frequency spectrum band may be shared by a plurality of network operating entities, as described with reference to FIGS. 3-7. In certain examples, the operations of block 1405 may be performed using the priority identifier described with reference to FIG. 9 or 10.

At block 1410, the wireless device may optionally monitor the radio frequency spectrum band during each of a number of CCA slots of the transmission interval. Each of the number of CCA slots may be associated with a higher priority than the identified priority of the wireless device, as described with reference to FIGS. 3-7. In certain examples, the operations of block 1410 may be performed using the LBT procedure manager described with reference to FIG. 9 or 10.

At block 1415, the wireless device may identify an absence of a predetermined transmission type in each of the number of CCA slots monitored at 1410, as described with reference to FIGS. 3-7. In some examples, the predetermined transmission type may include at least one of a preamble, a reservation message, an RTS message, an acknowledgement message, a CTS message, or a combination thereof. In certain examples, the operations of block 1415 may be performed using the LBT procedure manager described with reference to FIG. 9 or 10.

At block 1420, the wireless device may communicate over the radio frequency spectrum band based at least in part on the identified absence of the predetermined transmission type in each of the number of CCA slots associated with the higher priority than the priority of the wireless device, as described with reference to FIGS. 3-7. In certain examples, the operations of block 1420 may be performed using the wireless communication manager described with reference to FIG. 1, 8, 9, 10, 11, or 12.

At block 1425, the wireless device may optionally identify a second priority of the wireless device for a second transmission interval of the radio frequency spectrum band. The second priority may be the same as, or different from, the priority of the wireless device identified at block 1405 (i.e., the priority of the wireless device for a first transmission interval), as described with reference to FIGS. 3-7. In certain examples, the operations of block may be performed using the priority identifier described with reference to FIG. 9 or 10.

Figure 15:
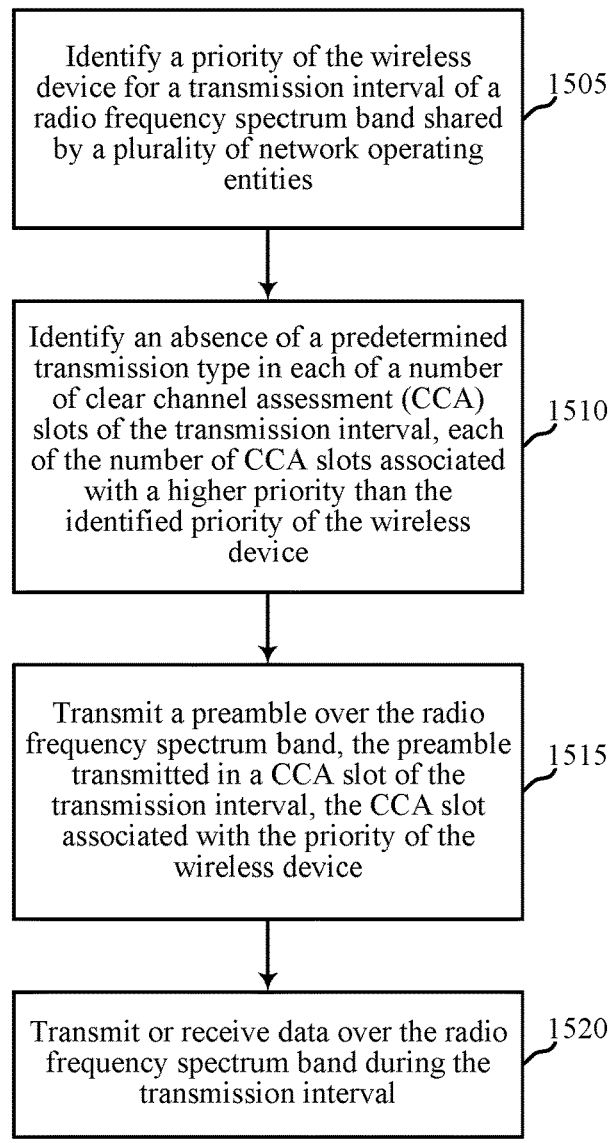
FIG. 15 shows a flowchart illustrating a method for wireless communication at a wireless device, in accordance with various aspects of the present disc.

FIG. 15 shows a flowchart illustrating a method 1500 for wireless communication at a wireless device, in accordance with various aspects of the present disclosure. The operations of method 1500 may be performed by a network access device 105, a UE 115, a wireless device 800 or 900 or its components, as described with reference to FIGS. 1-12. In some examples, the operations of method 1500 may be performed by the wireless communication manager described with reference to FIG. 1, 8, 9, 10, 11, or 12. In some examples, a wireless device may execute a set of codes to control the functional elements of the wireless device to perform the functions described below. Additionally or alternatively, a wireless device may perform aspects of the functions described below using special-purpose hardware.

At block 1505, a wireless device may identify its priority for a transmission interval of a radio frequency spectrum band. The radio frequency spectrum band may be shared by a plurality of network operating entities, as described with reference to FIGS. 3-7. In certain examples, the operations of block 1505 may be performed using the priority identifier 935 described with reference to FIG. 9 or 10.

At block 1510, the wireless device may identify an absence of a predetermined transmission type in each of a number of CCA slots of the transmission interval. Each of the number of CCA slots may be associated with a higher priority than the identified priority of the wireless device, as described with reference to FIGS. 3-7. In some examples, the predetermined transmission type may include at least one of a preamble, a reservation message, an RTS message, an acknowledgement message, a CTS message, or a combination thereof. In certain examples, the operations of block 1510 may be performed using the LBT procedure manager 940 described with reference to FIG. 9 or 10, or the preamble-based LBT procedure manager 1015 described with reference to FIG. 10.

At blocks 1515 and 1520, the wireless device may communicate over the radio frequency spectrum band based at least in part on the identified absence of the predetermined transmission type in each of the number of CCA slots associated with the higher priority than the priority of the wireless device, as described with reference to FIGS. 3-7. At block 1515, the wireless device may transmit a preamble over the radio frequency spectrum band. The preamble may be transmitted in a CCA slot of the transmission interval. The CCA slot may be associated with the priority of the wireless device. In some examples, a length of the transmission interval may be signaled in the preamble. In certain examples, the operations of block 1515 may be performed using the LBT procedure manager 940 described with reference to FIG. 9 or 10, or the preamble-based LBT procedure manager 1015 described with reference to FIG. 10.

At block 1520, the wireless device may transmit or receive data over the radio frequency spectrum band during the transmission interval, as described with reference to FIGS. 3-7. In certain examples, the operations of block 1520 may be performed using the wireless communication manager described with reference to FIG. 1, 8, 9, 10, 11, or 12.

Figure 16:
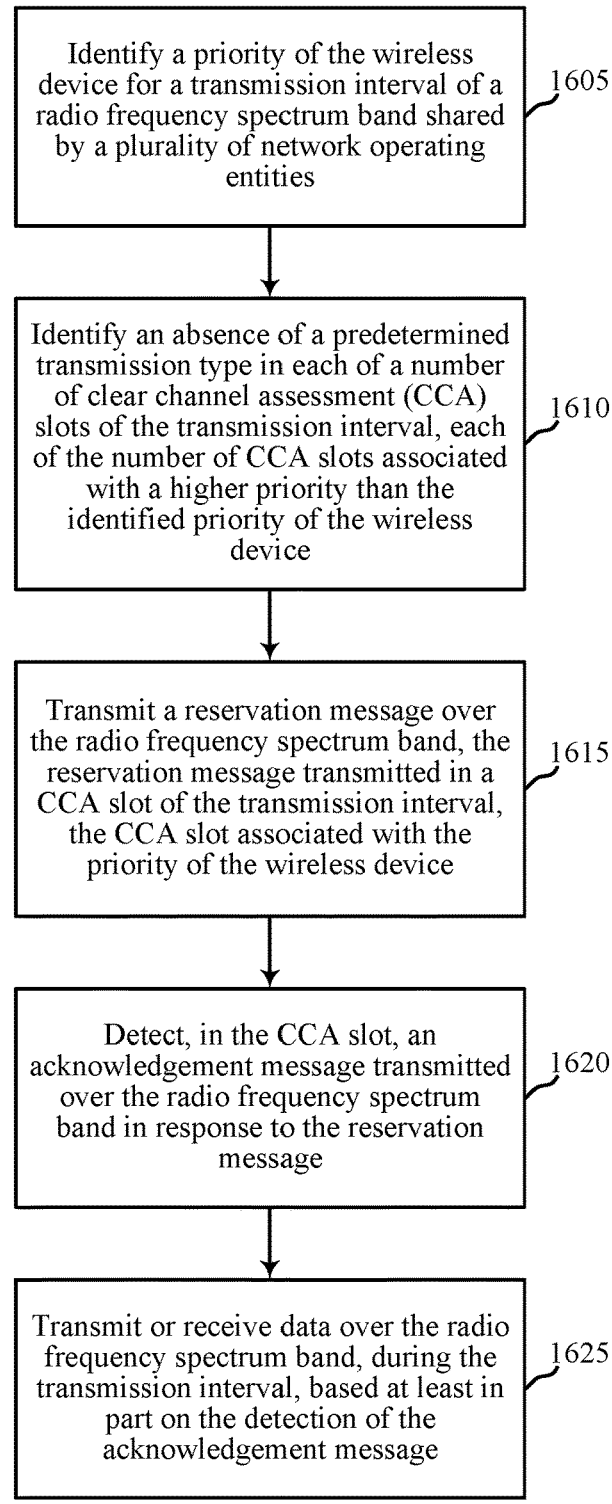
FIG. 16 shows a flowchart illustrating a method for wireless communication at a wireless device, in accordance with various aspects of the present disclosure.

FIG. 16 shows a flowchart illustrating a method 1600 for wireless communication at a wireless device, in accordance with various aspects of the present disclosure. The operations of method 1600 may be performed by a network access device 105, a UE 115, a wireless device 800 or 900 or its components, as described with reference to FIGS. 1-12. In some examples, the operations of method 1600 may be performed by the wireless communication manager described with reference to FIG. 1, 8, 9, 10, 11, or 12. In some examples, a wireless device may execute a set of codes to control the functional elements of the wireless device to perform the functions described below. Additionally or alternatively, a wireless device may perform aspects of the functions described below using special-purpose hardware.

At block 1605, a wireless device may identify its priority for a transmission interval of a radio frequency spectrum band. The radio frequency spectrum band may be shared by a plurality of network operating entities, as described with reference to FIGS. 3-7. In certain examples, the operations of block 1605 may be performed using the priority identifier 935 described with reference to FIG. 9 or 10.

At block 1610, the wireless device may identify an absence of a predetermined transmission type in each of a number of CCA slots of the transmission interval. Each of the number of CCA slots may be associated with a higher priority than the identified priority of the wireless device, as described with reference to FIGS. 3-7. In some examples, the predetermined transmission type may include at least one of a preamble, a reservation message, an RTS message, an acknowledgement message, a CTS message, or a combination thereof. In certain examples, the operations of block

1610 may be performed using the LBT procedure manager 940 described with reference to FIG. 9 or 10, or the preamble-based LBT procedure manager 1015 described with reference to FIG. 10.

At blocks 1615, 1620, and 1625, the wireless device may communicate over the radio frequency spectrum band based at least in part on the identified absence of the predetermined transmission type in each of the number of CCA slots associated with the higher priority than the priority of the wireless device, as described with reference to FIGS. 3-7. At block 1615, the wireless device may transmit a reservation message (e.g., a RTS message) over the radio frequency spectrum band. The reservation message may be transmitted in a CCA slot of the transmission interval. The CCA slot may be associated with the priority of the wireless device. In some examples, a length of the transmission interval may be signaled in the RTS message. In certain examples, the operations of block 1615 may be performed using the LBT procedure manager 940 described with reference to FIG. 9 or 10, or the RTS/CTS-based LBT procedure manager 1020 described with reference to FIG. 10.

At block 1620, the wireless device may detect, in the CCA slot, an acknowledgement message (e.g., a CTS message) transmitted over the radio frequency spectrum band in response to the reservation message. In certain examples, the operations of block 1620 may be performed using the LBT procedure manager 940 described with reference to FIG. 9 or 10, or the RTS/CTS-based LBT procedure manager 1020 described with reference to FIG. 10.

At block 1625, the wireless device may transmit or receive data over the radio frequency spectrum band, during the transmission interval, based at least in part on the detecting of the acknowledgement message at block 1620, as described with reference to FIGS. 3-7. In certain examples, the operations of block 1625 may be performed using the wireless communication manager described with reference to FIG. 1, 8, 9, 10, 11, or 12.

It should be noted that the methods described above illustrate possible implementations of the techniques described in the present disclosure. In some examples, aspects of the methods 1300, 1400, 1500, or 1600 described with reference to FIGS. 13-16 may be rearranged, modified, or combined. In some examples, the operations of the methods may be performed in different orders or include different operations. In some examples, aspects of each of the methods may include steps or aspects of the other methods, or other steps or techniques described herein.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein, but is to be accorded the broadest scope consistent with the principles and novel features disclosed herein.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different (physical) locations. Also, as used herein, including in the claims, "or" as used in a list of items (for example, a list of items prefaced by a phrase such as "at least one of" or "one or more") indicates an inclusive list such that, for example, a list of at least one of A, B, or C means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

Techniques described herein may be used for various wireless communication systems such as CDMA, TDMA, FDMA, OFDMA, single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as (Global System for Mobile communications (GSM)). An OFDMA system may implement a radio technology such as Ultra Mobile Broadband (UMB), Evolved UTRA (E-UTRA), IEEE 802.11, IEEE 802.16 (WiMAX), IEEE 802.20, Flash-OFDM, etc. UTRA and E-UTRA are part of Universal Mobile Telecommunication system (Universal Mobile Telecommunication system (UMTS)). 3GPP LTE and LTE-advanced (LTE-A) are new releases of UMTS that use E-UTRA. UTRA, E-UTRA, UMTS, LTE, LTE-a, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description herein, however, describes an LTE system for purposes of example, and LTE terminology is used in much of the description above, although the techniques are applicable beyond LTE applications.

The various illustrative blocks and modules described in connection with the disclosure herein may be implemented or performed with a general-purpose processor, a digital signal processor (DSP), an ASIC, an field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be performed by one or more other processing units (or cores), on at least one integrated circuit (IC). In various examples, different types of ICs may be used (e.g., Structured/Platform ASICs, an FPGA, or another semi-custom IC), which may be programmed in any manner known in the art. The functions of each unit may also be implemented, in whole or in part, with instructions embodied in a memory, formatted to be executed by one or more general or application-specific processors.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

What is claimed is:

1. A method for wireless communication at a wireless device associated with a first network operating entity, comprising:
   identifying a priority of the first network operating entity for a transmission interval of a radio frequency spectrum band shared by a plurality of network operating entities;
   identifying an absence of a transmission type in a first clear channel assessment (CCA) slot of the transmission interval, the transmission type being associated with a second network operating entity having a higher priority than the identified priority of the first network operating entity;
   transmitting, based at least in part on identifying the absence, a reservation message over the radio frequency spectrum band, the reservation message transmitted in a second CCA slot of the transmission interval that is preceded by the first CCA slot, the second CCA slot being associated with the priority of the first network operating entity;
   detecting, in the second CCA slot, an acknowledgement message transmitted over the radio frequency spectrum band in response to the reservation message; and
   communicating over the radio frequency spectrum band based at least in part on transmitting the reservation message and detecting the acknowledgement message.

2. The method of claim 1, further comprising:
   identifying an absence of a second transmission type in each of a number of CCA slots of the transmission interval, the second transmission type being associated with a third network operating entity and each of the number of CCA slots associated with a higher priority than the identified priority of the first network operating entity.

3. The method of claim 2, wherein communicating over the radio frequency spectrum band further comprises:
   communicating over the radio frequency spectrum band for a remainder of the transmission interval subsequent to the number of CCA slots in a frame, the communicating being based at least in part on the identified absence of the transmission type.

4. The method of claim 1, further comprising:
   transmitting the reservation message during a Request to Send (RTS) transmission opportunity of the second CCA slot, the reservation message comprising one or more of a downlink preamble, a payload, or a combination thereof.

5. The method of claim 4, wherein the payload comprises one or more device identifiers.

6. The method of claim 1, further comprising:
   detecting the acknowledgement message during a Clear to Send (CTS) transmission opportunity of the second CCA slot, the acknowledgement message comprising one or more of an uplink preamble, a payload, or a combination thereof.

7. The method of claim 1, further comprising:
   monitoring the radio frequency spectrum band during each of a plurality of CCA slots associated with a higher priority than the identified priority of the first network operating entity; and
   identifying, during each of the plurality of CCA slots and based at least in part on the monitoring, an absence of a second transmission type, the second transmission type being associated with a third network operating entity having a higher priority than the first network operating entity, wherein transmitting the reservation message over the radio frequency spectrum band is based at least in part on identifying the absence of the second transmission type associated with the third network operating entity.

8. The method of claim 1, further comprising:
   transmitting a preamble over the radio frequency spectrum band; and
   signaling a length of the transmission interval in the preamble.

9. The method of claim 1, wherein the reservation message comprises a Request to Send (RTS) message and the acknowledgement message comprises a Clear to Send (CTS) message.

10. The method of claim 9, wherein the RTS message and the CTS message include the same waveform.

11. The method of claim 9, wherein the RTS message signals a length of the transmission interval.

12. An apparatus for wireless communication at a wireless device associated with a first network operating entity, comprising:
   a processor,
   memory in electronic communication with the processor, and
   instructions stored in the memory and executable by the processor to cause the apparatus to:

identify a priority of the first network operating entity for a transmission interval of a radio frequency spectrum band shared by a plurality of network operating entities;

identify an absence of a transmission type in a first clear channel assessment (CCA) slot of the transmission interval, the transmission type being associated with a second network operating entity having a higher priority than the identified priority of the first network operating entity;

transmit, based at least in part on identifying the absence, a reservation message over the radio frequency spectrum band, the reservation message transmitted in a second CCA slot of the transmission interval that is preceded by the first CCA slot, the second CCA slot being associated with the priority of the first network operating entity;

detect, in the second CCA slot, an acknowledgement message transmitted over the radio frequency spectrum band in response to the reservation message; and communicate over the radio frequency spectrum band based at least in part on transmitting the reservation message and detecting the acknowledgement message.

13. The apparatus of claim 12, wherein the instructions are further executable by the processor to cause the apparatus to:

identify an absence of a second transmission type in each of a number of CCA slots of the transmission interval, the second transmission type being associated with a third network operating entity and each of the number of CCA slots associated with a higher priority than the identified priority of the first network operating entity.

14. The apparatus of claim 13, wherein the instructions are further executable by the processor to cause the apparatus to:

communicate over the radio frequency spectrum band for a remainder of the transmission interval subsequent to the number of CCA slots in a frame, the communicating being based at least in part on the identified absence of the transmission type.

15. The apparatus of claim 12, wherein the instructions are further executable by the processor to cause the apparatus to:

transmit the reservation message during a Request to Send (RTS) transmission opportunity of the second CCA slot, the reservation message comprising one or more of a downlink preamble, a payload, or a combination thereof.

16. The apparatus of claim 15, wherein the payload comprises one or more device identifiers.

17. The apparatus of claim 12, wherein the instructions are further executable by the processor to cause the apparatus to:

detect the acknowledgement message during a Clear to Send (CTS) transmission opportunity of the second CCA slot, the acknowledgement message comprising one or more of an uplink preamble, a payload, or a combination thereof.

18. The apparatus of claim 12, wherein the instructions are further executable by the processor to cause the apparatus to:

monitor the radio frequency spectrum band during each of a plurality of CCA slots associated with a higher priority than the identified priority of the first network operating entity; and identify, during each of the plurality of CCA slots and based at least in part on the monitoring, an absence of a second transmission type, the second transmission type being associated with a third network operating entity having a higher priority than the first network operating entity, wherein transmitting the reservation message over the radio frequency spectrum band is based at least in part on identifying the absence of the second transmission type associated with the third network operating entity.

19. The apparatus of claim 12, wherein the instructions are further executable by the processor to cause the apparatus to:

transmit a preamble over the radio frequency spectrum band; and signal a length of the transmission interval in the preamble.

20. A non-transitory computer-readable medium storing code for wireless communication at a wireless device associated with a first network operating entity, the code comprising instructions executable by a processor to:

identify a priority of the first network operating entity for a transmission interval of a radio frequency spectrum band shared by a plurality of network operating entities;

identify an absence of a transmission type in a first clear channel assessment (CCA) slot of the transmission interval, the transmission type being associated with a second network operating entity having a higher priority than the identified priority of the first network operating entity;

transmit, based at least in part on identifying the absence, a reservation message over the radio frequency spectrum band, the reservation message transmitted in a second CCA slot of the transmission interval that is preceded by the first CCA slot, the second CCA slot being associated with the priority of the first network operating entity;

detect, in the second CCA slot, an acknowledgement message transmitted over the radio frequency spectrum band in response to the reservation message; and communicate over the radio frequency spectrum band based at least in part on transmitting the reservation message and detecting the acknowledgement message.

* * * * *